(12) United States Patent
Lyras

(10) Patent No.: US 12,346,861 B2
(45) Date of Patent: Jul. 1, 2025

(54) SYSTEM AND METHOD FOR IDENTIFYING RELEVANT INFORMATION FOR AN ENTERPRISE

(71) Applicant: Dimitris Lyras, London (GB)

(72) Inventor: Dimitris Lyras, London (GB)

(*) Notice: Subject to any disclaimer, the term of this patent is extended or adjusted under 35 U.S.C. 154(b) by 0 days.

(21) Appl. No.: 17/898,471

(22) Filed: Aug. 29, 2022

(65) Prior Publication Data

US 2023/0091884 A1    Mar. 23, 2023

Related U.S. Application Data

(63) Continuation of application No. 16/525,853, filed on Jul. 30, 2019, now Pat. No. 11,615,360, which is a continuation of application No. 14/334,712, filed on Jul. 18, 2014, now Pat. No. 10,410,156, which is a continuation-in-part of application No. 14/032,332, filed on Sep. 20, 2013, now abandoned, which is a continuation of application No. 13/668,525, filed on Nov. 5, 2012, now Pat. No. 8,571,910, which is a continuation of application No. PCT/EP2010/056273, filed on May 7, 2010.

(51) Int. Cl.
| | |
|---|---|
| G06Q 10/0635 | (2023.01) |
| G06F 16/00 | (2019.01) |
| G06F 16/31 | (2019.01) |
| G06F 40/205 | (2020.01) |
| G06Q 10/063 | (2023.01) |
| G06Q 10/10 | (2023.01) |

(52) U.S. Cl.
CPC ......... *G06Q 10/0635* (2013.01); *G06F 16/00* (2019.01); *G06F 16/31* (2019.01); *G06F 40/205* (2020.01); *G06Q 10/063* (2013.01); *G06Q 10/10* (2013.01)

(58) Field of Classification Search
CPC ............. G06Q 10/0635; G06Q 10/063; G06Q 10/10; G06F 16/00; G06F 16/31
USPC ......................................... 705/7.28
See application file for complete search history.

(56) References Cited

U.S. PATENT DOCUMENTS

| 7,778,807 B2 * | 8/2010 | Konno ................... G06Q 10/10 703/2 |
| 9,858,357 B2 * | 1/2018 | Bhattacharyya .... G06F 16/9024 |
| 2003/0046130 A1 * | 3/2003 | Golightly ........... G06Q 30/0206 705/7.29 |
| 2005/0055330 A1 * | 3/2005 | Britton .................... H04L 67/01 |

(Continued)

*Primary Examiner* — Abdallah A El-Hage Hassan
(74) *Attorney, Agent, or Firm* — Wiggin and Dana LLP

(57) ABSTRACT

A system and method are provided for finding and retrieving information within an enterprise that is relevant to enterprise problems, enterprise opportunities, and unexpected or interesting events. The method includes scanning content related to a process conducted by an enterprise, where the process includes one or more process steps; identifying a problem, opportunity or event associated with a process step (an enterprise stress point); indexing the scanned content with respect to the enterprise stress point; determining whether the scanned content is information relevant to the problem, opportunity or event; and providing relevant information to a user. The relevant information includes a description or discussion of a contemporaneous or previous experience of the enterprise regarding the problem, opportunity or event.

8 Claims, 20 Drawing Sheets

(56) References Cited

U.S. PATENT DOCUMENTS

| | | | |
|---|---|---|---|
| 2006/0074726 A1* | 4/2006 | Forbes | G06Q 10/067 |
| | | | 705/7.36 |
| 2006/0133586 A1* | 6/2006 | Kasai | G06Q 10/10 |
| | | | 707/E17.009 |
| 2007/0208772 A1* | 9/2007 | Harik | G06F 16/3344 |
| | | | 707/999.102 |
| 2008/0005153 A1* | 1/2008 | Kraft | G06F 9/4488 |
| | | | 707/999.102 |
| 2008/0177767 A1* | 7/2008 | Lin | H04L 45/64 |
| | | | 709/251 |
| 2008/0281915 A1* | 11/2008 | Elad | G06Q 30/02 |
| | | | 709/204 |
| 2010/0318646 A1* | 12/2010 | Ungermann | H04J 3/0652 |
| | | | 709/223 |
| 2015/0269504 A1* | 9/2015 | Bhattacharyya | G06F 16/9024 |
| | | | 705/7.28 |
| 2019/0164082 A1* | 5/2019 | Wu | G06N 20/00 |

* cited by examiner

SYSTEM AND METHOD FOR IDENTIFYING RELEVANT INFORMATION FOR AN ENTERPRISE

CROSS-REFERENCE TO RELATED APPLICATION

This patent application is a continuation of pending U.S. patent application Ser. No. 16/525,853, titled "System and Method for Identifying Relevant Information for an Enterprise," by Lyras, that was filed on Jul. 30, 2019, which is a continuation of U.S. patent application Ser. No. 14/334,712 (now patented as U.S. Pat. No. 10,410,156), titled "System and Method for Identifying Relevant Information for an Enterprise," by Lyras, that issued on Sep. 10, 2019 which is a continuation in part of U.S. Ser. No. 14/032,332 (now abandoned), titled "System and Method for Identifying Relevant Information for an Enterprise," by Lyras, that was filed on Sep. 20, 2013 that is a continuation of U.S. patent application Ser. No. 13/668,525 (now patented as U.S. Pat. No. 8,571,910) also titled, "System and Method for Identifying Relevant Information for an Enterprise," by Lyras, that issued on Oct. 29, 2013 and is a continuation of International Patent Application PCT/EP2010/056273 that designates the United States and is titled "System and Method for Identifying Relevant Information for an Enterprise" that was filed on May 7, 2010. The disclosures of U.S. Ser. Nos. 16/525, 853, 14/334,712, 14/032,332, U.S. Pat. No. 8,571,910 and PCT/EP2010/056273 are incorporated by reference herein in their entireties.

TECHNICAL FIELD

This disclosure relates to enterprise software, and more particularly to a software aid for finding information which is relevant to problems, opportunities, and/or unexpected or interesting events affecting processes conducted by the enterprise.

BACKGROUND OF THE DISCLOSURE

An enterprise (which may be any organization carrying on activities for some purpose) generally has goals and processes designed to achieve those goals. Problems in the enterprise will generally impact the success of one or more processes; these problems must be identified in a focused and efficient manner. Persons in the enterprise (users of an enterprise system) need to be alerted to problems that may cause a risk to processes for which they are responsible. A user needing to solve a problem will want to have information at his disposal which is relevant to the problem, particularly information about contemporaneous and past experiences in the enterprise that are relevant to the problem. The user will also want to collaborate with other users on solving the problem.

Accordingly, it is desirable to implement a system that identifies and retrieves information that is relevant to a problem associated with a process, and directs that information to users most concerned with the problem.

BRIEF SUMMARY OF THE DISCLOSURE

In accordance with the disclosure, a system and method are provided for finding and retrieving information within an enterprise that is relevant to enterprise problems, enterprise opportunities, and unexpected or interesting events. As the system searches for enterprise information, it indexes current items (e.g. circulating e-mails) and past items (e.g. archived memos) to enrich the knowledge of the system relating to the problem, opportunity, or event.

According to a first aspect of the disclosure, a system for finding information relevant to a process performed by an enterprise or to an enterprise stress point of said process includes a computing device configured to scan content related to a process conducted by an enterprise, where the process includes one or more process steps; identify a problem, opportunity or event (an enterprise stress point) associated with the process step; index the scanned content with respect to the enterprise stress point; determine whether the scanned content is information relevant to the problem, opportunity or event; and provide relevant information to a user. The relevant information includes a description or discussion of a previous experience of the enterprise (or related enterprises) regarding the problem, opportunity or event. The scanned content may include e-mail communication within, to or from the enterprise; documents produced by the enterprise; application data related to the process including business objects; and/or Web content accessible to the enterprise. The enterprise stress point is a problem, opportunity, or unexpected or interesting event and relates to other stress points further describing a risk, a cause, an effect, or a remedy.

Determining whether information is relevant to the problem, opportunity or event may further include determining the impact of completion of a process step on achievement of a goal related to a process including that process step; this is termed the goal proximity of the process step. The goal proximity of a process step may also be used to determine risk, which is an important relevance criterion.

A determination of goal proximity may also be used to find similar processes which, through similarity in their generic aspects and similarity of proximity to a goal, are considered similar; experiences related to these similar processes are returned by the system for the attention of the users.

Determining relevance may be facilitated by identifying processes which are characterized in the system by their generic process components, such that an inference of similarity or relevance between processes can be drawn through their generic aspects. In addition, endemic problems or opportunities embedded in processes can establish further similarity or relevance between processes.

The system may include a scanner for scanning content related to a process conducted by an enterprise; a language parser for identifying concepts within the scanned content; and an index engine for indexing the scanned content with respect to a process node (the process node having associated therewith a problem, opportunity or event), and for determining whether the scanned content is information relevant to the problem, opportunity or event. The language parser and the indexing engine together assign a stress point relevance to concepts within the scanned content, thereby generating a stress point index for items of the scanned content.

The system may further include a user interface utilizing the stress point index to alert a user to a problem associated with a related set of processes; enable collaboration between users addressing a problem or opportunity associated with a process by restricting the returned information to contemporaneous and historical information related to processes for which the users in the collaboration are stakeholders, and by enabling information related to subordinate processes to be returned if that information is likely to cause risk to the processes for which the collaborating parties are stakeholders; or retrieve information including a description or discussion of a previous experience relating to a problem associated with a process. In an embodiment, the indexing engine is a middleware service.

According to another aspect of the disclosure, a user may navigate a cognitive structure retrieving past and current experiences which may be used for a variety of uses described herein.

It should be noted that, in accordance with the disclosure, when solving enterprise problems, exploiting enterprise opportunities, or explaining interesting or unexpected events occurring within the sphere of the enterprise, the relevance of an item of content or data to the enterprise may be determined entirely by relating that content or data to the relevant enterprise stress points (process nodes) and to the elements of the cognitive structure most closely related to those process nodes; similarities between processes may be determined entirely by referring to identification of the processes and their generic process components, the goal proximity of the respective processes to their dependent processes, and the endemic problems, opportunities or events associated with the processes; and when a process node within a step is determined to present a risk, the severity of that risk may be determined entirely by referring to (i) the goal proximity of that step to its direct goal, (ii) the goal proximity of that step and its effect on further dependent goals, (iii) the estimated cost of failed goals and remedial action, and (iv) the probability of the node in question experiencing a failure.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
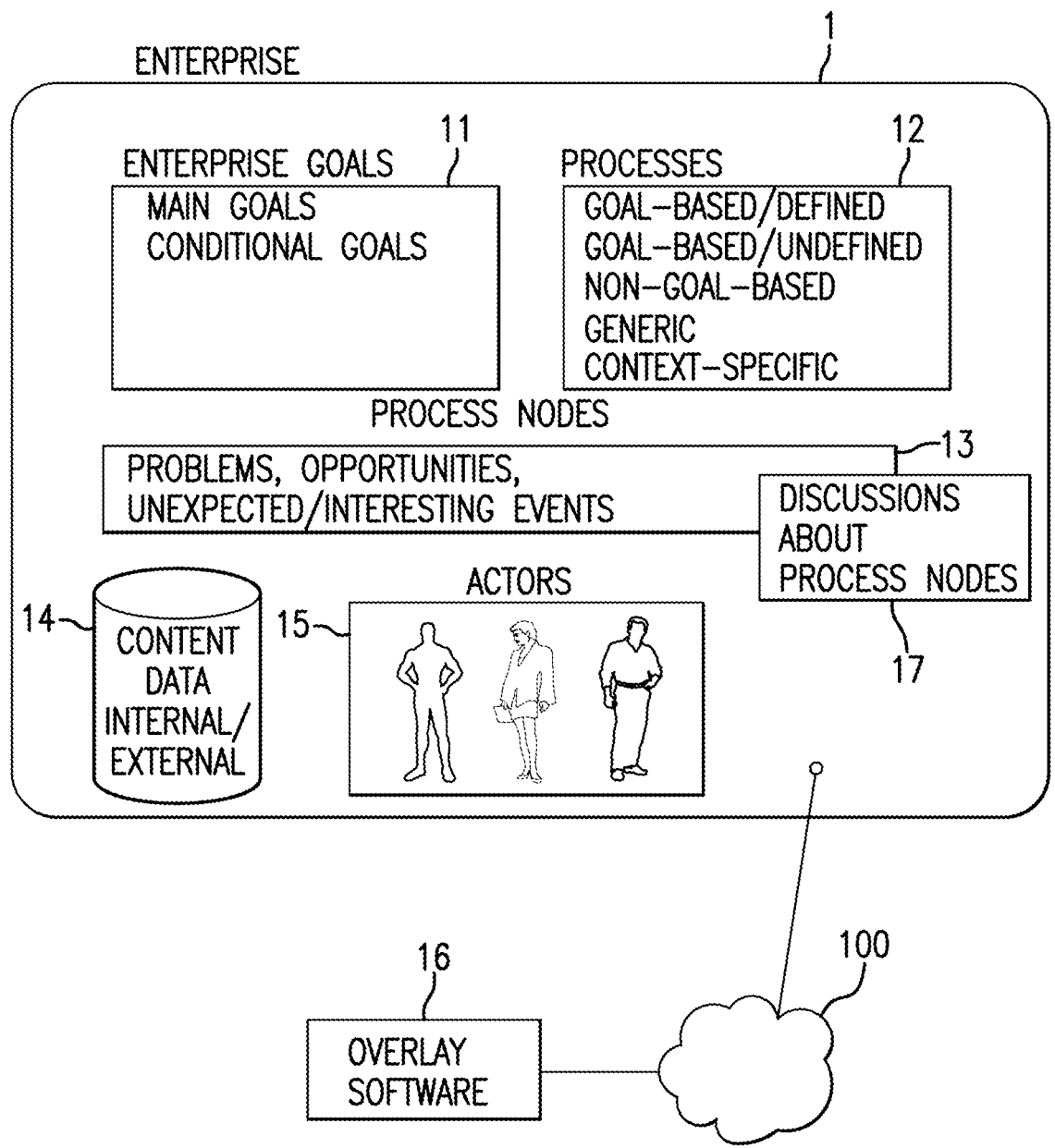
FIG. 1 schematically illustrates an enterprise having goals and processes, with software for finding relevant information linked to the enterprise, in accordance with an embodiment of the disclosure.

Software embodying the present disclosure is referred to herein as "Overlay." The Overlay is an aid for finding information within the enterprise; sources of this information are thus typically enterprise internal content and enterprise data, including communications within the enterprise and communications between the enterprise and outside parties. Another source of information is external information related to the enterprise that the enterprise wishes to access regularly. One aspect of the Overlay is that it functions as a relevance engine, as opposed to a search engine; the Overlay retrieves only information that is considered relevant to enterprise problems and opportunities and unexpected or interesting events.

The Overlay software uses relevance between enterprise processes and relevance between enterprise stress points in such processes (that is, focus points in the business that represent hazards, expectation failures, conflicts, risks, common causes and related areas of attention and knowledge), to present to the user only relevant returns from underlying data and content, so as to accomplish the following:

Provide a user of the Overlay with an overview of underlying changes in any enterprise software/e-mails that may constitute an enterprise stress point for which the user is responsible. In a large organization it is impossible for senior personnel to manually navigate and monitor all applications in this way, or to have hard wired workflows of every possible issue that might potentially constitute a problem. Since enterprise stress points are often caused by a combination of multiple events, the Overlay helps to identify those enterprise stress points and avoids excessively granular notification when it is not wanted;

Enable the user of the Overlay to access enterprise content and/or data systems (including email systems) from remote locations using a handheld device, and to render a filtered view of events affecting the enterprise stress points;

Enable the user of the Overlay to process events and co-ordinate warnings as well as enrich content with knowledge related metadata; and Enable the Overlay user to manage undesired events assisted by relevant legacy content.

Glossary

Cause: An occurrence or potential occurrence that is deemed to be a cause of an effect.

Root cause: An occurrence or potential occurrence that is deemed to be the reason the cause has occurred.

Effect: An occurrence or potential occurrence that is deemed to effect a process or plan goal or conditional goal.

Risk: A potential effect. This can be both positive when it corresponds to an opportunity or negative when it corresponds to a problem.

Diagnosis: Finding the cause of problems and explaining interesting events or causes of opportunity.

Organize: To be an abstraction of, to generalize, to group.

Goal Proximity/proximity: The percentage effect of a process step on the goal of the process to which that step belongs.

Goals or conditional goals: The goals and conditional goals for which an enterprise process has been designed.

Cognitive structure: A structure that indexes information in a way that fits known cognitive principles.

Primary means of understanding more about the problem or opportunity: The methods by which the most appropriate relevance is determined about a problem or opportunity.

Cases/discussions/descriptions/experiences: These are cases of experiences which may describe all or part of cause, effect, risk, and remedy. They may include generalized explanations and models for describing how things behave in the processes where they are assigned.

Models: Generalized cases explaining cause and effect.

Explanations: Explanations of problems or opportunities or unexpected events.

Attributes: Characteristics of entities mentioned in this disclosure. Node attributes are used to determine similarity of nodes. That is, the characteristics of nodes that determine similarity. Node attributes are represented in a state model. That is, the characteristics of nodes are represented in a state model.

Responsible: A situation where an actor's attributes significantly affect the outcome of a process or process step.

Problems/failures: In the present disclosure, problems and failures are considered nodes within processes where highly experienced practitioners reasonably expect problems and/or failures or unexplained phenomena or phenomena of unexplained cause and effect.

Opportunities/successes: In the present disclosure, opportunities and successes are considered nodes within processes where highly experienced practitioners reasonably expect opportunities and/or successes.

Event/unexpected event/interesting event: In the present disclosure, an event is an occurrence that to a highly experienced practitioner is reasonably considered important to the enterprise and its goals.

Process nodes: Parts of processes where highly experienced practitioners expect problems and opportunities.

Highly experienced practitioners: People who have been participating and have been responsible for a process for which they are considered highly experienced for most of their careers and are aware of the particular process and its main characteristics, and are also aware of the processes dependent and subordinate to the process for which they are considered highly experienced.

Enterprise: Any organization or collection of organizations carrying on activities for one or more known purposes; generally characterized by predictability of goals at any one time, predictability of plans and processes to achieve those goals, and actors with substantially known values, skills, knowledge, information, endurance, and emotion with respect to goals.

Enterprise activity structure: A framework of related relevance criteria that are recognized by practitioners in most domains.

Enterprise activity: Activities recognized by practitioners in each domain or in more than one domain.

External process: The external processes taking place outside the enterprise upon which some enterprise processes depend: e.g. design, construction, or education, and preparation activities that may be part of any process step; processes found to occur in the environment which are not designed to serve known goals but affect enterprise processes and goals, for example discretionary human behavior: or processes not directly related to human behavior, such as environmental phenomena.

Practitioners: People who have average experience in the enterprise.

Overlay: A system and/or method in accordance with the present disclosure.

Endemic problems/opportunities/nodes: Problems, opportunities, or unexplained/potential/occasional occurrences, at various levels of abstraction that are considered by highly experienced practitioners to be repetitive in a variety of related processes. Endemic problems/opportunities are associated with goals since problems and opportunities cannot be defined without first defining goals.

Object: An object in the domain which is part of a process.

Context: An environment in the domain within which a process takes place.

Abstracted object: An object that may be abstracted and therefore may apply to more than one domain Abstracted context: A context that may be abstracted and therefore may apply to more than one domain.

Domain: An industry, a department of a company, or any enterprise structure where process steps and terminology are specific and yet practitioners understand them.

Ossified: A property of an entity within the enterprise activity model which varies but is considered constant, because practitioners expect the property to be fairly constant and predictable.

Relevance criteria: Any entity which helps to build the enterprise activity model or structure Circumstance: Context, object time or similar.

Process: A series of actions serving a set of goals and conditional goals. These can range from ossified processes, to established processes, to newly established processes, to plans that are processes yet to be put in practice.

Script: A process that is performed consciously and subconsciously because it has been ossified.

Plan: A plan is a less well defined process where the steps in the process are ordered in a way fitting the current circumstances. The goal hierarchy of plans is often different from the underlying processes they incorporate.

Inanimate process: A process that does not involve human intervention (such as a chemical process) and therefore may not have goals other than the goals of the process within which it has been designed by humans to be a part. For example, corrosion is an inanimate process that is predictable and well known, but nevertheless would not be considered a goal based process.

Non goal based animate processes: Processes that people experience but are not clearly goal based such as appreciating a certain type of music or liking a certain colour. A common word for this is discretionary.

Condition: as defined in the English language and in AI.

Enterprise Goals and Processes

As shown schematically in FIG. 1, an enterprise 1 generally has goals 11 and processes 12 designed to achieve those goals. Enterprises and enterprise departments generally have the following attributes with respect to goals: collective values, collective skills, collective knowledge, collective information, collective endurance, and collective emotion. One or more enterprises may belong to a domain, defined as an industry, a department of a company, or any enterprise structure where process steps and terminology are specific and yet practitioners understand them. Practitioners in a given domain may thus be said to have shared, specific knowledge.

The goals 11 may include enterprise goals (often expressed at a high level, so that specific processes are not associated therewith), main goals (achievement of which directly affects one or more enterprise goals), and conditional goals (that is, goals that are not the primary reason for designing a process, but if not met may prevent achievement of the main goal or else may allow achievement of the main goal but render that achievement undesirable). Processes may be goal-based (generally, carried out by actors in the enterprise in furtherance of a goal), non-goal based but enacted and not usually designed by humans, or non-goal based and not enacted or designed by humans. Processes include the function of machinery or any process designed by humans for human goals but not necessarily enacted by humans. In carrying out the various processes in an enterprise, risks are encountered; problems and opportunities arise; these problems have causes, effects, risk or potential effects, and remedies.

Those parts 13 of processes where experience has shown that risks, problems and/or opportunities may present themselves, or unexpected or interesting events may occur, are termed "enterprise stress points" or "process nodes." Process nodes are often identified by experienced actors 15 within the enterprise. The Overlay software 16, which in an embodiment is accessed by the enterprise as a service over the Web 100, searches enterprise internal content and data 14, and in some cases external data also, yielding information which is indexed against the identified stress points. The indexed information then has a stress point relevance assigned thereto. The Overlay searches are natural language searches, based on the process nodes in the enterprise and the wording used to describe them. The Overlay also searches for structured data known to be related to each process node.

More generally, a process may be either internal and external, or some combination of the two; the internal process being enacted in the enterprise, and the external process taking place outside the enterprise; e.g. design, construction, or education, and preparation activities that may be part of any process step, processes found to occur in the environment which are not designed to serve known goals but affect enterprise processes and goals, for example discretionary human behaviour, or processes not directly related to human behaviour such as environmental phenomena.

Process Nodes

Figure 2:
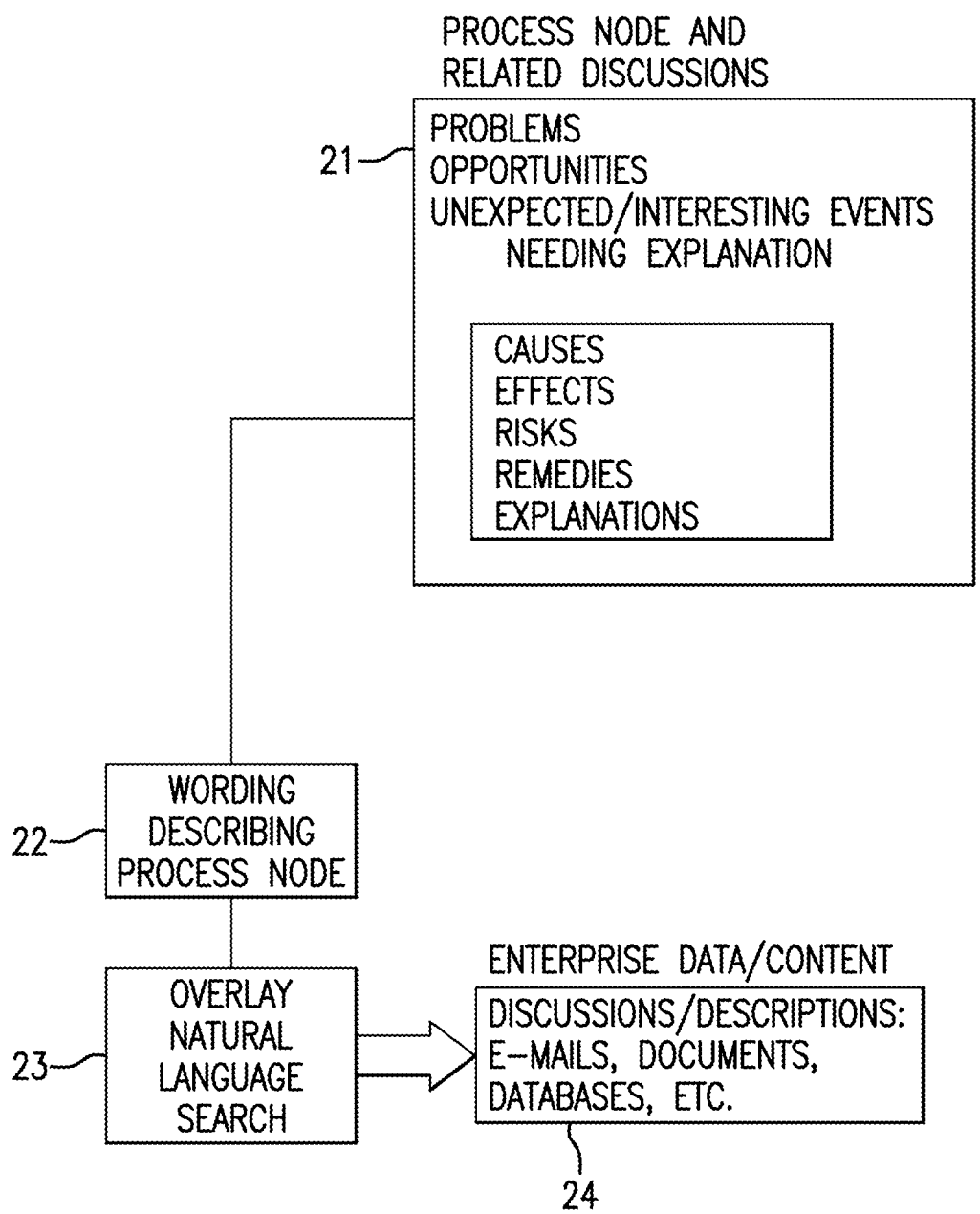
FIG. 2 schematically illustrates aspects of a process node for a process of the enterprise.

As shown schematically in FIG. 2, a process node 21 is characterized by one or more problems, opportunities and/or unexpected/interesting events in a process or in a process step of a process. The wording 22 describing a process node is used in a natural language search 23 of enterprise data and internal content (and other sources of information) 24.

Process nodes for an enterprise represent components of a cognitive structure (discussed further below). The process nodes as parts of a cognitive structure contain discussion or descriptions of problems and/or opportunities and/or events that practitioners find relevant to goals and/or processes in the enterprise, or sometimes outside the direct activities of the enterprise. Such activities outside the direct activities of the enterprise can be, but are not limited to, other enterprises; the business world; the political environment; the social environment; the physical environment; the biological environment; or any environment which significantly affects an enterprise process.

Process nodes may also include variances to the discussion and/or descriptions of potential problems or opportunities or events, as follows:
  (a) Discussion and/or description or data about a problem or opportunity or unexpected event in executing one or more of the goals or conditional goals in a process that
    (1) at the time of the discussion or description, or at a later time, was considered an effected process;
    (2) constitutes a dependent process to the process effected;
    (3) contains a problem or opportunity that could become active should a subordinate process fail;
    (4) contains a problem or opportunity, and/or a potential problem or opportunity, in a subordinate process to the process effected.
  (b) Discussion and/or description or data regarding:
    (1) An explanation of a problem, opportunity or unexpected event;
    (2) A cause analysis of a problem or opportunity or unexpected event;
    (3) A root cause (cause of a cause) analysis of a problem or opportunity or unexpected event;
    (4) A plan considered an action to remedy a problem or exploit an opportunity;
    (5) A procedure describing how to avoid a problem or how to exploit an opportunity.

Discussions or descriptions relating to a process node can be in text or in figures, or any combination that constitutes customary indication used in enterprise software or content. This could include but is not limited to spreadsheets, e-mails, documents, meta-data, data in databases, electronic messaging, voice communications, etc.

A cognitive structure, as discussed herein, is a structure having information indexed in a way that fits known cognitive principles, the cognitive principles being structured so that they relate to each other in a way that permits the relevance of the information to be determined.

Figure 3:
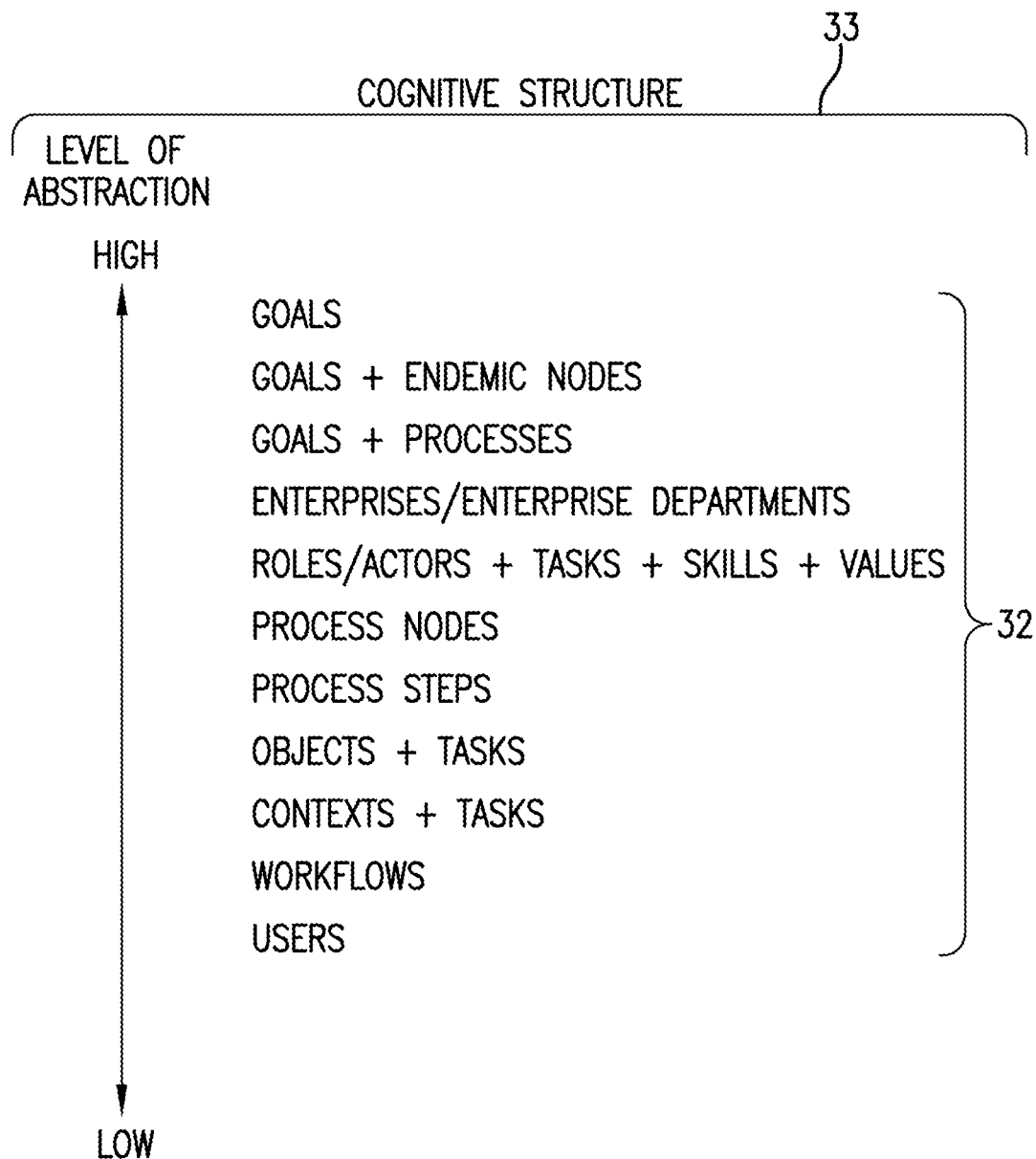
FIG. 3 schematically illustrates abstraction of activities underlying a definition of a process node.

As shown schematically in FIG. 3, a cognitive structure 33 is an abstraction of day to day activities and their related objects; these are activities and objects familiar to the average practitioner outside the domain of the enterprise because they are used in day to day enterprise activities throughout most domains. Such enterprise activities and objects 32 include but are not limited to: users, user roles, tasks, contexts in which tasks and processes take place, enterprise objects, processes, goals, skills, values, actors in a process, or any generalization of these. A given process node represents components of the cognitive structure. All nodes and entities in the cognitive structure may have abstractions and/or be abstractions of other entities.

Accordingly, cognitive structure 33 may include:
Goals;
Goals and associated processes, and associated endemic nodes (discussed below);
Enterprises, enterprise departments, and associated roles, actors, and attributes (e.g. skills, values etc.);
Generalized process nodes;
Specific process nodes;
Lower level goals and associated process steps;
Tasks and the actors or roles that enact them;
Contexts and associated processes or tasks they affect;
Objects and the associated processes or tasks they affect;
Workflows; and
Users.

The Overlay software is also a finder of information relevant to any process or process node or any element of the cognitive structure. Information retrieval methods used by the Overlay software are applied to this relevant information. These retrieval methods also apply to most elements of the cognitive structure.

The term "relevant" includes, but is not limited to: related as a process at risk, as an additional process at risk, a cause process, an abstracted cause process, additional cause processes, remedial action processes, related as a similar process to any other process, related by common context or object or abstraction of these, related by common node or abstraction, related by a common goal or conditional goal, or combinations of these.

Information is irrelevant, for the purpose of the Overlay, if it is not the primary means for understanding more about a problem, opportunity, or unexpected/interesting event.

The relevance of an item of content or data to the enterprise may be determined entirely by referring to the enterprise stress points (process nodes), as explained more fully below.

Analyzing Processes; Process Similarity

Figure 4:
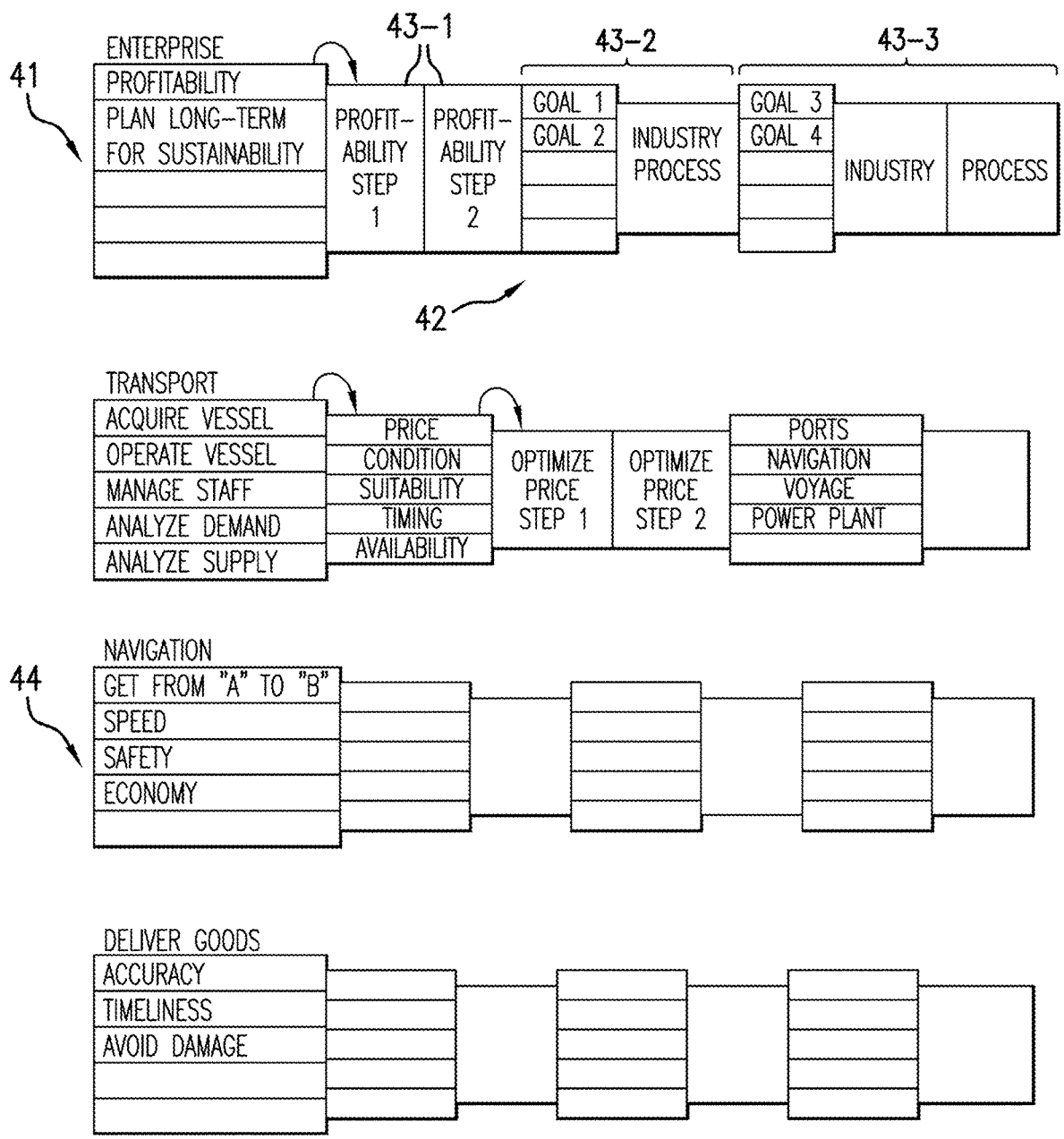
FIG. 4 illustrates goals and associated processes for an enterprise.

FIG. 4 is a schematic illustration of some goals and processes for an enterprise. In this illustration, a set of goals 41 for the overall enterprise has numerous processes designed to achieve those goals; one process 42 has steps 43. The enterprise shown is involved in the transport of goods, including specifically transport of goods by sea; accordingly, there is another set of goals 44 in the domain of the enterprise dealing with "Navigation." In this example, a process 45 for navigating from one point to another has these steps 46: seeing (e.g. finding navigational aids), moving (e.g. operating an engine), and plotting a course to the desired location. As shown in more detail in FIG. 5, the process step for "seeing" involves the need for eyeglasses; lost eyeglasses constitute a problem for that process step.

An enterprise in a different domain (e.g. military training) with different goals 47 (e.g. firing a field gun) may nonetheless have some process steps similar to the navigation process 45. The group of goals 47 includes main goals ("fire gun", "hit target") and conditional goals ("avoid other objects," "avoid explosion"); the conditional goal "avoid explosion" needs to be met so that goal "fire gun" can be achieved in the manner desired. The process 48 for achieving the goal "fire gun" includes a step 49 for "see the target." The activity "seeing" may be viewed as a generic activity relevant to both processes. In addition, process 48 includes a step 50 for "adjust gun." The process step for "adjust gun" involves the need for a wrench, a lost wrench constitutes a problem for that process step. The lost eyeglasses and lost wrench may be viewed as examples of a generic problem (that is, a generic node), namely "lost tools."

Figure 5:
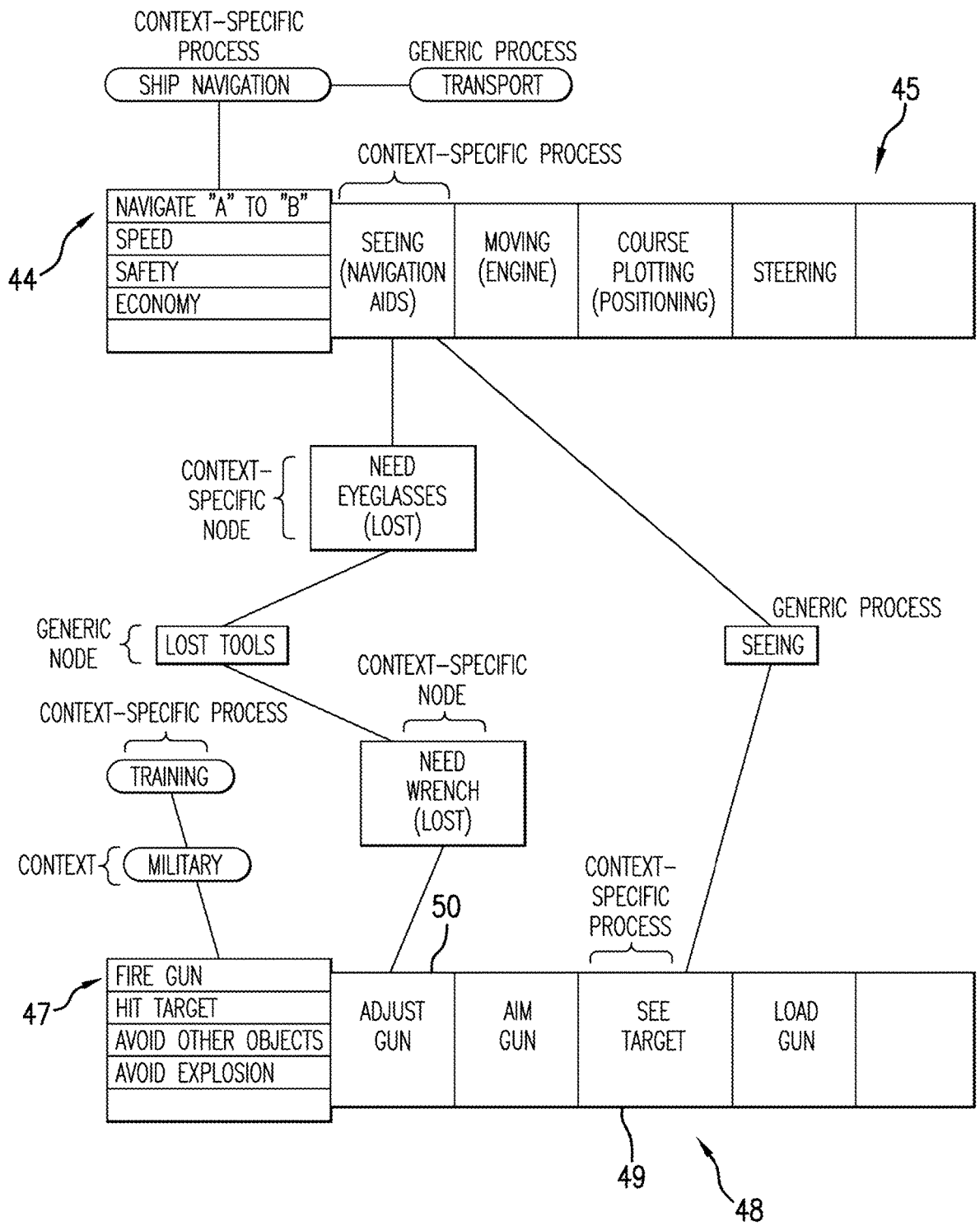
FIG. 5 illustrates some details of two processes, and problems relating to those processes.

Several nodes and processes are labelled in FIG. 5 as context-specific or generic. It can be seen that processes in different domains are nevertheless related by generic processes and generic nodes. More generally, once context-specific nodes are identified, those context-specific nodes define more generic nodes. These more generic nodes in turn define generic components of context/domain specific processes for a given domain. These generic process components and their generic nodes will exist in another domain at some level of generality and thus indicate specific nodes in this different context/domain.

One process node can be similar to another process node; this is determined by process or process step similarity which is explained in more detail herein. As shown in FIG. 5, process steps of different processes often have commonalities. When a process step is common to two processes, then the two processes are considered similar if the process step is similarly able to affect the main process goal to which it belongs. The effect that a process step has on the goal to which that step belongs is called the "goal proximity" of that process step.

The Overlay software finds cases similar to the problems and/or opportunities of a given process node by finding similar process nodes, and then indicating similar cases where the process and process node and goal proximity are similar. In this regard, it should be noted that the Overlay does not rely on a vast array of process conditions for case similarity. The Overlay evaluates process similarity from goal proximity and from similarity of nodes and abstracted nodes or endemic nodes. (Abstracted nodes or endemic nodes provide an alternate way of defining abstracted processes, because processes are devised to deal with highly abstracted endemic nodes at the most abstracted level.) In a given process, process conditions are contained within that process; finding a similar process will thus define comparable conditions. This is because the salient conditions are in fact incorporated in process nodes (problems and opportunities within the process). It follows that if the process nodes are defining criteria of a process, they are also sufficient to define the conditions within that process.

It should be noted that the Overlay searches for similarities in both processes and the nodes included therein. In general, processes are developed to enable problem nodes to be avoided and opportunity nodes to be exploited. A given process may have more than one node. It follows that node similarity is included in process similarity.

In addition, the hierarchy of the goals in a process affects a determination of similarity. Goal hierarchy of goals and conditional goals in a process determine the goal profile of a process; this is considered an additional defining characteristic of process similarity. Processes that have similar goal hierarchy are likely to be similar. Process similarity thus does not depend only on common process steps or common generalization of those process steps.

Goal Proximity; Success Probability

Figure 6A:
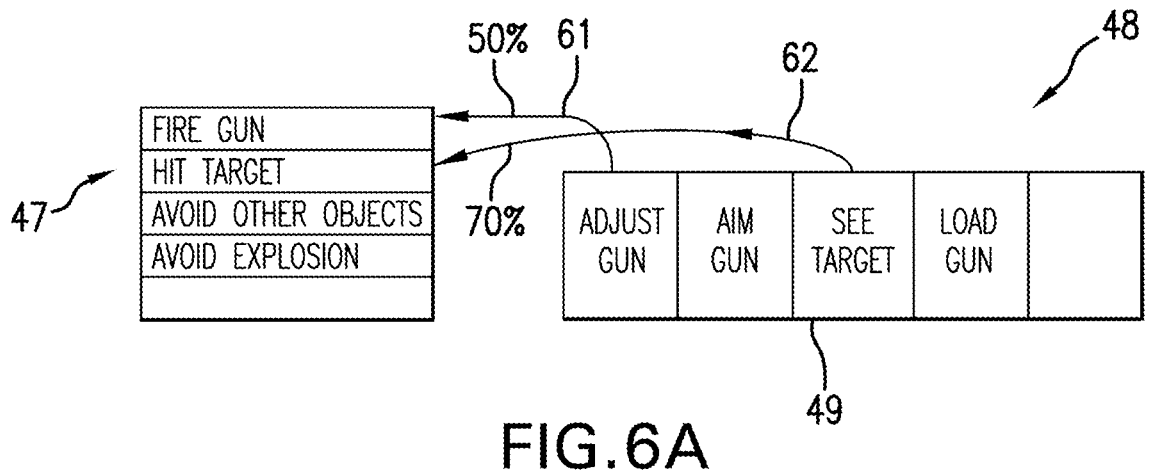
FIG. 6A illustrates goal proximity for various process steps.

In general, not every process step is equally critical to achieving success of the process goal. As noted above, the term "goal proximity" refers to the effect that a process step has on the main process goal to which that step belongs. The goal proximity of a process step may be quantified in terms of how proximate the process step is to achieving success or failure of the process goal(s) or the conditional goals. For example, as shown in FIG. 6A, achieving the goal "fire gun" is judged to be 50% dependent on completion of the process step "adjust gun". Achieving the goal "hit target" is judged to be 70% dependent on completion of the process step "see target". These relationships are shown schematically by 61 and 62 in FIG. 6A. It follows that problems in process steps with high goal proximity have an increased impact on the success of that process. Goal proximity provides an additional criterion for process similarity; processes with similar effect on goals of dependent processes, and processes which also have common generic or particular characteristics (for example, common nodes), are considered similar even if they occur in different domains.

The abundance of resources (or lack thereof) in a process is considered an attribute of the process steps within the process. Accordingly, a redundancy of resources affects the goal proximity of the process. Furthermore, a problem or opportunity in a process step affects the proximity of the process step to the goal in accordance with the abundance of resources or redundancy of processes.

Figure 6B:
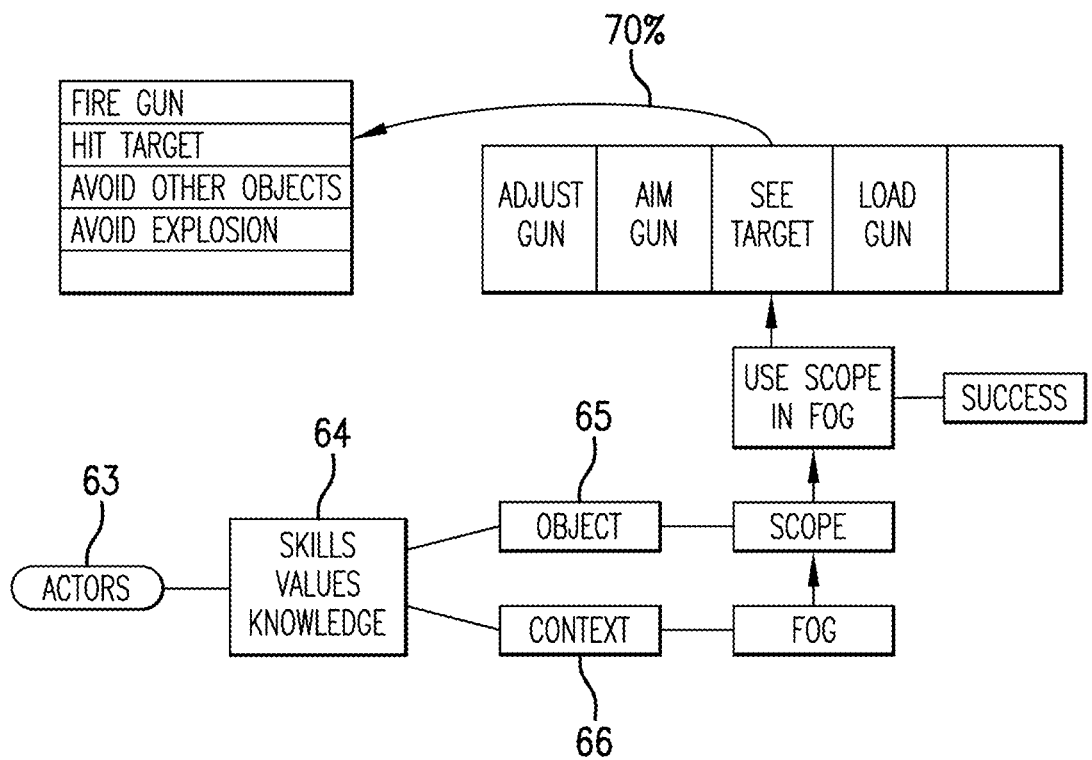
FIG. 6B illustrates interaction between actors in an enterprise and a given process step.

Actors (persons performing or otherwise concerned about a process) also affect the success of a process. As shown schematically in FIG. 6B, actors affect the process steps for which they are primarily responsible. Actors generally have these attributes: values, skills, expertise, information, endurance, and emotion. Depending on the process steps, other actor attributes may be considered relevant. The attributes in turn affect the probability of expected problems or opportunities with respect to a process step, and thus affect the goal of the process. In the example shown in FIG. 6B, actors 63 responsible for the step "see target" have skills, values and knowledge 64 which they bring to bear on both the object(s) 65 involved with the process step and the context 66 in which the step is performed. If the object used in the step "see target" is a viewing scope, and the context is fog, then the actor's skill in using the scope in fog to see the target will have a significant impact on success. It can be seen from this example that process steps themselves also have goals ("find target using scope"), and actor attributes affect these goals. In general, the process steps which the actors perform or influence significantly have goals and conditional goals, and it is the goals and conditional goals of these steps or their constituents that the attributes of the actors influence.

Generic Processes and Nodes

Processes can be abstracted into generic process groups; processes may belong to generic groups and processes may have generic process steps. For example, navigating a vessel can belong to a general process of "travel in control of a vehicle or vessel", and it can have generic constituents such as seeing, steering, planning, etc. Generic processes are processes which are not specific to a domain, and which practitioners with average expertise in another domain would recognize. In general, processes have generic components or belong to larger generic processes.

Generic processes are less context-specific processes in a given domain. As they reach a higher level of abstraction, they contain less specific and more generalized nodes. The least context specific processes may be so general as to have no specific steps and thus may be difficult to identify other than through endemic nodes (discussed further below).

Figure 7A:
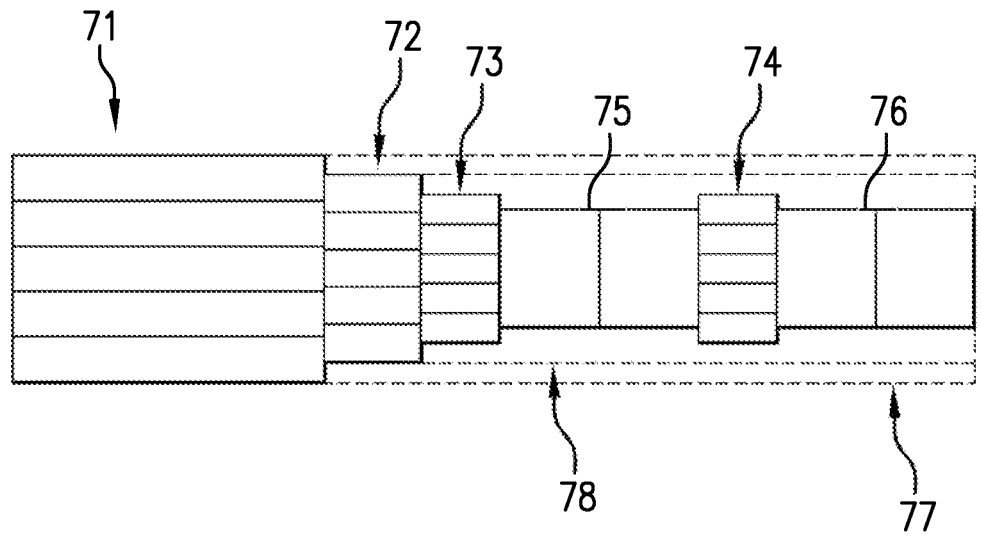
FIG. 7A schematically illustrates generic processes and more specific processes.

Generic processes may be represented schematically as shown in FIG. 7A. A set of high-level goals 71 has a set of subsidiary goals 72, which in turn has sets of subsidiary goals 73, 74. Processes 75 and 76 are designed to achieve goals 73, 74 respectively. The solid boundaries in the depiction of processes 75, 76 indicate that these processes are domain-specific processes; the dotted lines represent a generic process 77 and generic process substeps 78.

Generic processes may have nodes, contexts and objects that are generalized from the many domain processes they are found to be a part of by practitioners and the general public. They may be biased toward one or more particular domains when they have fewer attributes than if all domains are considered. This applies to (but is not limited to) contexts, objects, generalized nodes, etc.

Figure 7B:
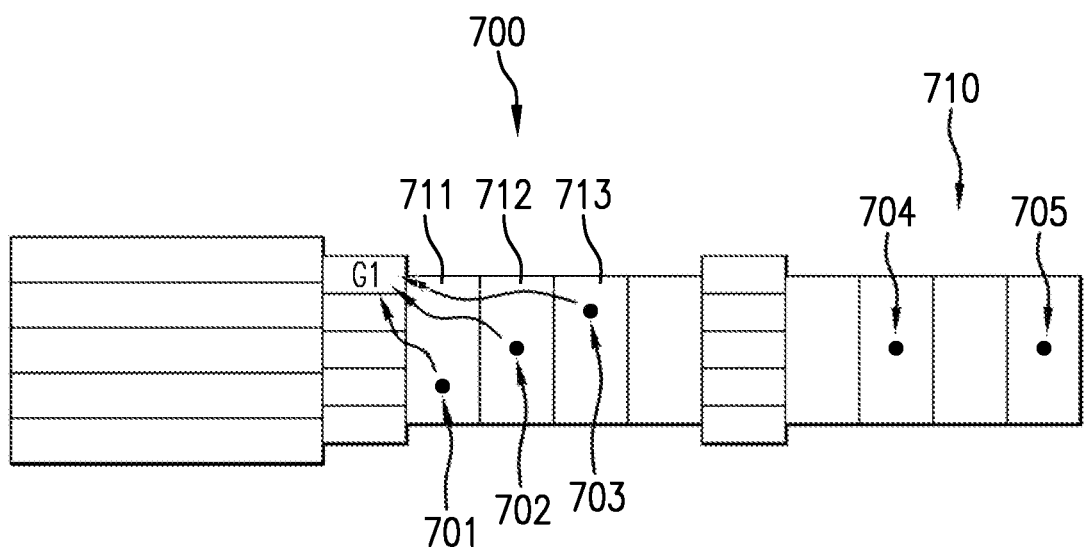
FIG. 7B schematically illustrates processes including process nodes or enterprise stress points.

Process nodes may be schematically represented as shown in FIG. 7B. A node appears in each of three process steps of process 700, and in two process steps of process 710. Nodes 701-705 each may be a risk, cause, effect or remedy related to a problem/opportunity/event occurring with respect to that process or some other process.

In process 700 shown in FIG. 7B, each of the process steps 711-713 has a goal proximity with respect to goal G1. There is also, separately, a probability of failure of the process if the node represents a risk. These concepts are used to analyze the risk associated with the process. Unlike other risk analysis approaches, in the Overlay software risk is assigned by goal proximity, and separately assessing probability. As described above, goal proximity is a percentage assigned to the degree to which a goal or conditional goal in a process is affected by the success or failure of a subordinate process. Goal proximity for processes of equal level of subordination or dependence is additive to a total of 1 or 100%. Each dependent process is dependent on the next lower level of equally subordinate level processes. For example, directing a vessel in the navigation process is dependent on propulsion and steering 100%. Propulsion and steering is 100% dependent on electrical power. At the level of the vessel directing process, there are other process steps of equal subordination such as keeping watch, voyage planning and managing personnel.

Risk is assessed in terms of goal proximity. When a process node within a step is determined to present a risk, the severity of that risk may be determined entirely by referring to the goal proximity of that step with respect to its direct goal, the goal proximity of that step with respect to further dependent goals, the cumulative cost of goal failure and the cumulative cost of remedial action of the goal failure.

Goal proximity is useful in assessing the cost of a process and the cost of software to manage a process. Goal proximity of a cause and effect link combined with probability and the cost of failure or revenue from success of affected processes plus the cost of the remedial action process are quantitative indicators of risk or opportunity. It follows then that the processes designed to manage risk or exploit opportunity have a cost to the company. It also follows that selling overlay software to manage relevant information to mitigate risk and exploit opportunities has a value. The overlay sets up the right indicators for valuing processes and their node and thus valuing the software that helps manage these processes by mitigating risk and managing opportunity.

Risk, or potential opportunity, may be estimated determined more qualitatively by availability of relevant experiences within the processes likely to be affected by a problem, as determined by the goal proximity of dependent processes. Further quantitative evaluation of effect, risk or opportunity is achieved by multiplying the goal proximity with the percentage probability of failures and opportunities within subordinate processes.

Connected Processes

Figure 8:
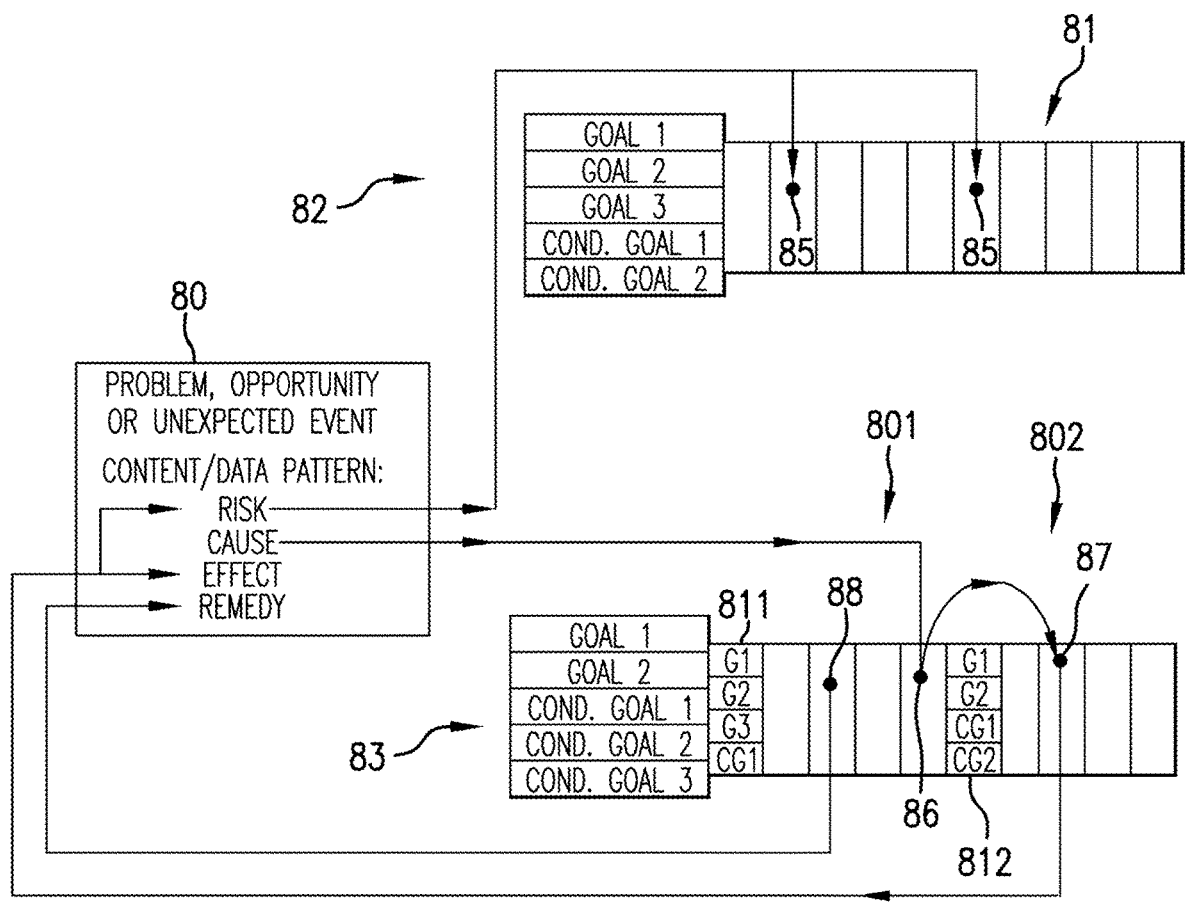
FIG. 8 schematically illustrates process nodes representing risks, causes, effects and remedies across a plurality of processes.

It should be noted that nodes representing risks, causes, effects or remedies serve to connect processes together. A simplified example of this is shown in FIG. 8.

An opportunity or unexpected event 80, as described in some content or revealed by some data pattern, has a risk, cause, effect and remedy associated therewith. In general, that risk, cause, effect and remedy will not all be found in one process. Process 81, associated with goal set 82, is distinct from processes 801, 802 that are associated with goal set 83 and subsidiary goal sets 811, 812. These processes all have nodes associated with the problem/opportunity/event 80. In the example shown, nodes 85 indicate process steps in process 81 that present a risk. Node 86 at a step in process 801 indicates a cause of the problem/opportunity/event, while node 87 indicates an effect thereof on a step in process 802. Node 88, at another step in process 801, represents a remedy.

Endemic Problems and Themes

As noted above, generic processes are less context-specific domain processes; as they reach a higher level of abstraction they contain less specific and more generalized nodes.

Generic processes can be abstracted into types; a type of generic process may be associated with a process at the domain level, and would be recognized by an experienced practitioner in a similar domain. For example, travel is a different type of generic process than managing personnel. Certain problems or opportunities, at various levels of abstraction, are considered by experienced practitioners to be repetitive over a variety of related processes. Such problems/opportunities are referred to as endemic. Endemic problems/opportunities are associated with goals, since problems and opportunities cannot be defined without first defining goals.

A type of generic process is defined by its endemic problem/opportunity set. In the field of personnel management, for example, there are many personnel-related endemic problems and opportunities dating back to antiquity, and a whole domain of processes has grown to deal with those problems and opportunities. Furthermore, high level generic processes are defined by their endemic nodes. In the Overlay, generic processes that contain generalized nodes, and/or further generalizations, are also grouped under endemic problems or opportunities. This is done because when processes become very general their process steps also become very general, and the entire process becomes difficult to define except by referring to the endemic problems or opportunities (usually called themes). In the Overlay, generic processes are defined by the set of abstracted endemic problems or opportunities that they encompass.

In assessing process similarity, an additional similarity criterion is the endemic problem(s) found in generic processes or process steps. Two apparently different process steps with some very high level similarity can found to be similar if they suffer from the same expected problems or opportunities of an abstracted nature.

High level endemic problems or opportunities (themes) serve to organize lower level endemic problems more specific to a domain, which in turn serve to organize an unrestricted number of levels of endemic problems in an unrestricted number of domains. Endemic problems or opportunities (themes) also organize high level generic processes, which in turn organize an unrestricted number of lower level generic processes more specific to domains.

Words used to describe generic processes are often shorthand for a series of goals and associated endemic problems that would take too long to express in natural language. Therefore groups of endemic problems at various levels of abstraction can have names associated with generic processes at various levels of abstraction.

Objects and Contexts

As discussed above with reference to FIG. 6B, objects and contexts alter the effect of the nodes on the process completion and the satisfaction of a goal. The nodes may become more or less likely to affect the process and its goals as a result of the context or object being different. In some cases, the process nodes are different when the process is very specific to a domain and has very specific contexts and objects. Context and objects in turn are affected by the actors and their attributes (or enterprises or enterprise departments and their attributes). Accordingly, different actors will generally have a different effect on the same process due to differences in object or context. The context or object itself may introduce more or less probability of affecting the process goal(s) or dependent process goal(s).

Object and context changes have effects both on processes and on goal proximity. Goal proximity varies in accordance with processes. But processes involve objects and contexts that may be different in different domains while the process is otherwise very similar. Therefore, for ease of adaptation of the Overlay from domain to domain, the Overlay incorporates relationships between object contexts and their processes according to the domain, so that in a new domain the system will highlight those objects and contexts that are different and may require reassessment of the goal proximity of each process step, especially when such steps are affected by the object or context difference. For ease of adaptation from domain to domain or enterprise to enterprise, the Overlay may also include relationships between context and objects and actors, users, and other elements of the cognitive structure.

Objects and contexts can be generalized or broken down into constituents, and can have relationships between them. Objects and context relevant to the enterprise have generalizations and constituents, as well as relationships between them, which vary according to the goals and associated processes or plans in which they play a part.

The degree to which the system requires all or part of the attributes to be dynamically related to each other is based on the experience and requirements of each domain, and on the client application of the system. When not all the attributes are dynamically active, the default status is to hold constant the dynamic interrelationship of attributes with the entity they would normally affect. For example, when actor attributes are considered average for the sake of convenience, then their effect on the probability of problems and opportunities arising in a process step is neutral. In another example, when the redundancy of a resource used in a process step is average, then the proximity of that process step in affecting the goal is average. The effect of attributes is average when experts in the processes involved consider them average for that domain.

Objects and/or contexts, as well as time-related designations of contemporaneous events, serve to determine whether two indications of a similar event are in fact the same event. This is important when the goal of the search for relevant information is to find content and data contemporaneous with that event.

Goal Hierarchy and Goal Conflicts

An investigation of the goal hierarchy and conflicts between goals in a process is required to determine which subordinate process step is more important in any one circumstance. The more consistently the process is applied, the more consistent the goal hierarchy, and the more attention is paid to designing the process to avoid problems due to goal conflicts. When a process is varied and becomes more like a plan of action with new process steps and new goal structure, then the goal hierarchy and goal conflicts need to be re-established, and new process steps applied to mitigate the negative effect of the goal conflicts and inappropriate results as a consequence of poorly maintained goal hierarchy.

Overlay Relevance Model: Goals, Processes and Nodes

It is useful, but not essential, to have a consistent relationship between goals, processes, and nodes (referred to herein as a relevance convention). If the relationships between goals, processes, and nodes seem consistent for Overlay users but do not follow a convention, the relevance results (that is, cases of experience returned by the relevance engine) may still be highly satisfactory because current practices generally do not group goals, processes and nodes by any consistent convention. A relevance convention used in accordance with an embodiment of the disclosure is detailed below.

Node Attributes

Node attributes help define nodes so that nodes may be used to draw similarities between processes and similarities between cases of experience. This is normally done only by expert users of the system. Node attributes may be grouped as follows:

(1) Goals and actors: Goal conflicts may exist between actors that lie behind the nodes and the processes designed to overcome these conflicts. For example: A legal contract is designed as a process for agreeing on how conflicts can be avoided or adjudicated; a machinery design is a process that overcomes the conflict between profit and cost of a machinery product; a taximeter is a process automation that overcomes the conflict between the taxi service business and the client regarding prices.

Goal conflicts can exist between the goals of different actors and/or between main goals and conditional goals. A further type of goal conflict can exist between a goal and obstacles existing in the environment, while the goal is assisted by the assets available in that environment. Assets and obstacles are context specific and are affected by a specific goal conflict. For example, the conflict between quality and cost affects the quality and efficiency of manufactured products; each product has particular assets and obstacles affected by this goal conflict. The customary goal conflict of quality versus cost, within the manufacturing processes and manufacturing machinery functions encompassed by the product, has nodes associated therewith. The nodes associated most closely with this goal conflict are the cause nodes of any product malfunction. The goal conflicts therefore are closely related to the nodes in the cause processes.

(2) Assets and obstacles: Assets and obstacles are the context and process specific elements that are most closely associated with each node. They are elements within processes that change in accordance with the context, but also generalize into more generic assets and obstacles when grouped in the appropriate context generalisation. Referring again to the example of manufactured products and the inherent goal conflict between quality and cost, groups of similar products with design commonalities within the same context (e.g. hydraulic fluid pumps) will have similar problems characterized by the assets and obstacles affected. In addition, due to design variations between products in the same contextual groups, there will also be assets and obstacles associated with problem nodes that are different between the products. Where this is the case, the context structure needs to separate the products further into individual products, with individual specific problems and associated assets and obstacles. This means that the nodes of this very particular contextual grouping do not generalize across other contexts. However, all will be grouped under the goal conflict of quality and cost. Accordingly, context groups govern the assets and obstacles that are active in active problem or opportunity nodes. Some contexts involve more generic nodes and generalize more readily; some remain particular to very specific contexts.

The relevance of assets and obstacles to the node are governed by the context structure. Nodes are the manifestation of the assets facing obstacles that may cause a problem or opportunity in a process. When the nodes are not the result of goal conflicts between actors, but instead between the goals of the process and the assets and obstacles of the context in which the process takes place, then the relevant assets and obstacles are those that are active when the problem or opportunity is active.

(3) Cause nodes and affected nodes: Cause nodes accompany the affected nodes, and describe why a given node is active as a problem or opportunity or event. Nodes that may be active in cause processes, as well as nodes that may be active in the affected processes, are used to identify node attributes.

(4) Relationship between goal conflicts and cause nodes: Goal conflicts that belong to the same abstracted group are caused by nodes with similar abstracted attributes, while the affected node attributes may be more varied and less easy to group without specialized domain knowledge. The cause and effect relationship between cause nodes and affected nodes is helpful in associating nodes from one context specific domain to another context specific domain.

Expert User Process

Expert Overlay users, when populating the cognitive structure of the system, assign node attributes at various context specific levels of abstraction. The expert Overlay users then assign node attributes to higher level abstractions. Computerized methods may also be used to model node attributes to assist the expert users.

Identifying Nodes

Figure 9:
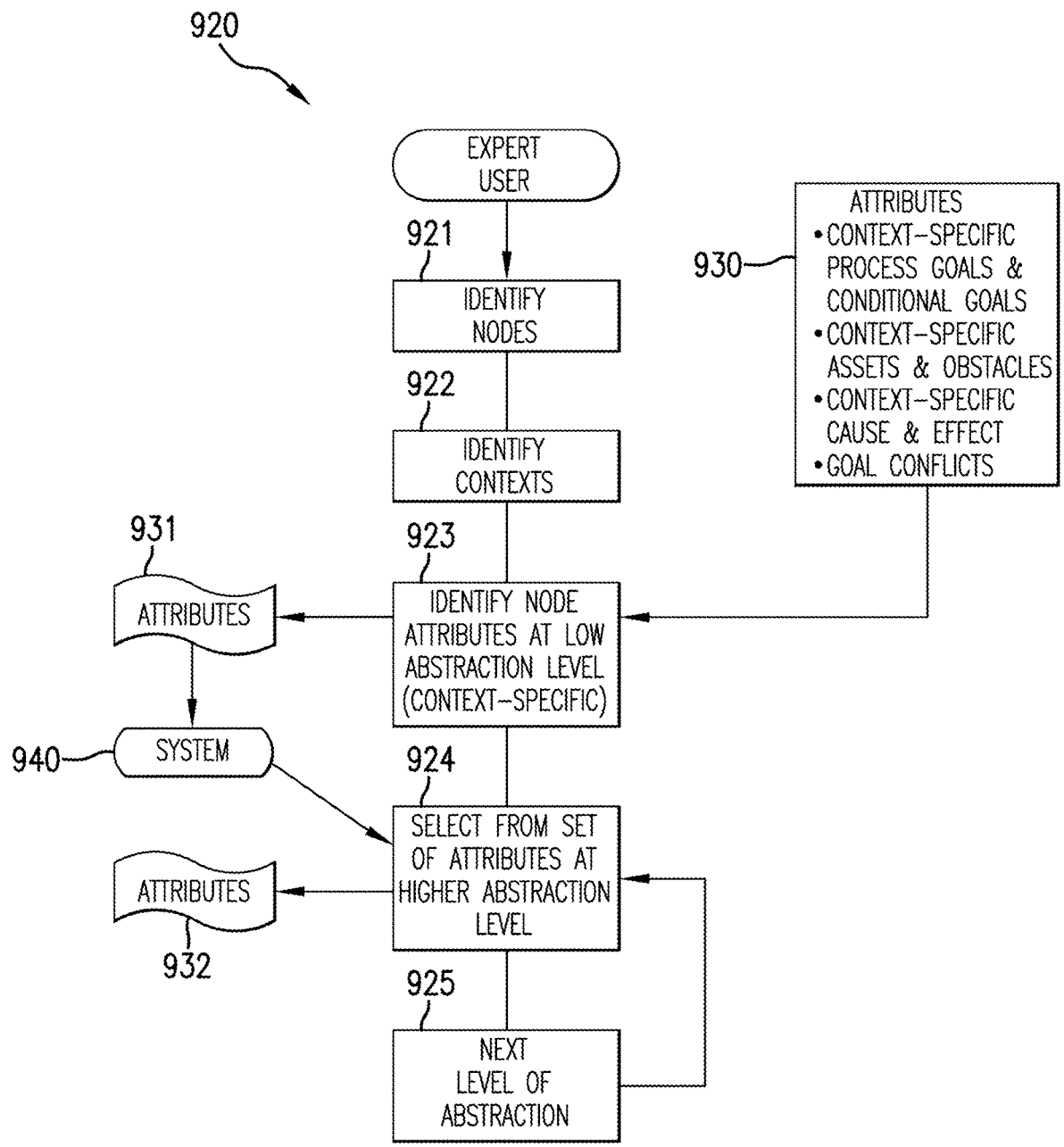
FIG. 9 is a flowchart illustrating a procedure by which an expert user may assign node attributes at various context specific levels of abstraction.

The following procedure (illustrated in FIG. 9) may be followed by an expert user 920 to identify nodes at various levels of abstraction, in accordance with the disclosure.

(1) Identify nodes: The expert overlay users identify the nodes found in a context specific process whose similarity to other processes is sought (step 921);

(2) Identify context relating to each node at the various levels of abstraction (step 922). This is achieved through the domain (context specific) process model particular to the enterprise in which the process in question and the processes which depend on it are analyzed for context specificity;

(3) Identify lower context level node attributes (step 923): The expert overlay users identify the node attributes as described above as node attributes 930: Attributes 931 include context specific process goals and conditional goals; goal conflicts; context specific assets and obstacles; and context specific cause and effect of the nodes for the process whose similarity with other processes is sought;

(4) Select from a set of abstracted lower context level node attributes (step 924): In other words select from a pre-populated set of node attributes at a stage of context abstraction above the level in steps 1 to 3. The overlay system 940 shows the user a selection of higher level node attributes; the expert user selects higher level attributes 932 to match the lower level attributes of the nodes identified in step 3; and (5) Select for a higher or highest context level set of node attributes (step 925): The overlay shows a selection of higher or highest context level enterprise node attributes. The expert user selects the highest level attributes that match the attributes identified in step 3.

The above series of steps can be applied to a selection of nodes so that process similarity can be identified, or it can be applied to a single node so that nodes similarity can be identified.

Processes and their Relationship to Nodes

Process similarities are identified by comparing the attributes of the nodes of the contextually specific process to higher level abstracted node attributes. For example: A context specific process, such as seeing a target in a military training exercise, has several nodes (e.g. inability to see due to physical obstructions, inability to see due to bad light, inability to see due to scope malfunction, etc.). These in turn can be abstracted by an expert Overlay user into higher level node abstractions (e.g. inability to see due to obstacles, inability to see due to atmosphere, inability to see due to loss of sight enhancing equipment). The new abstracted node cluster yields a higher level generic process which is an abstraction of the specific process of seeing a target.

The reverse of abstraction may be performed, to match higher level generic processes to lower level context specific processes via node attributes, but in reverse order by taking more generic nodes and their attributes and relating them to context specific nodes in the other domain. In this way two process in different domains or in similar domains but different contexts can be matched for similarity. This similarity in turn provides the ability to draw on experience in one context specific domain to predict problems or opportunities in another context specific domain.

Identifying a Similar Process

Figure 10:
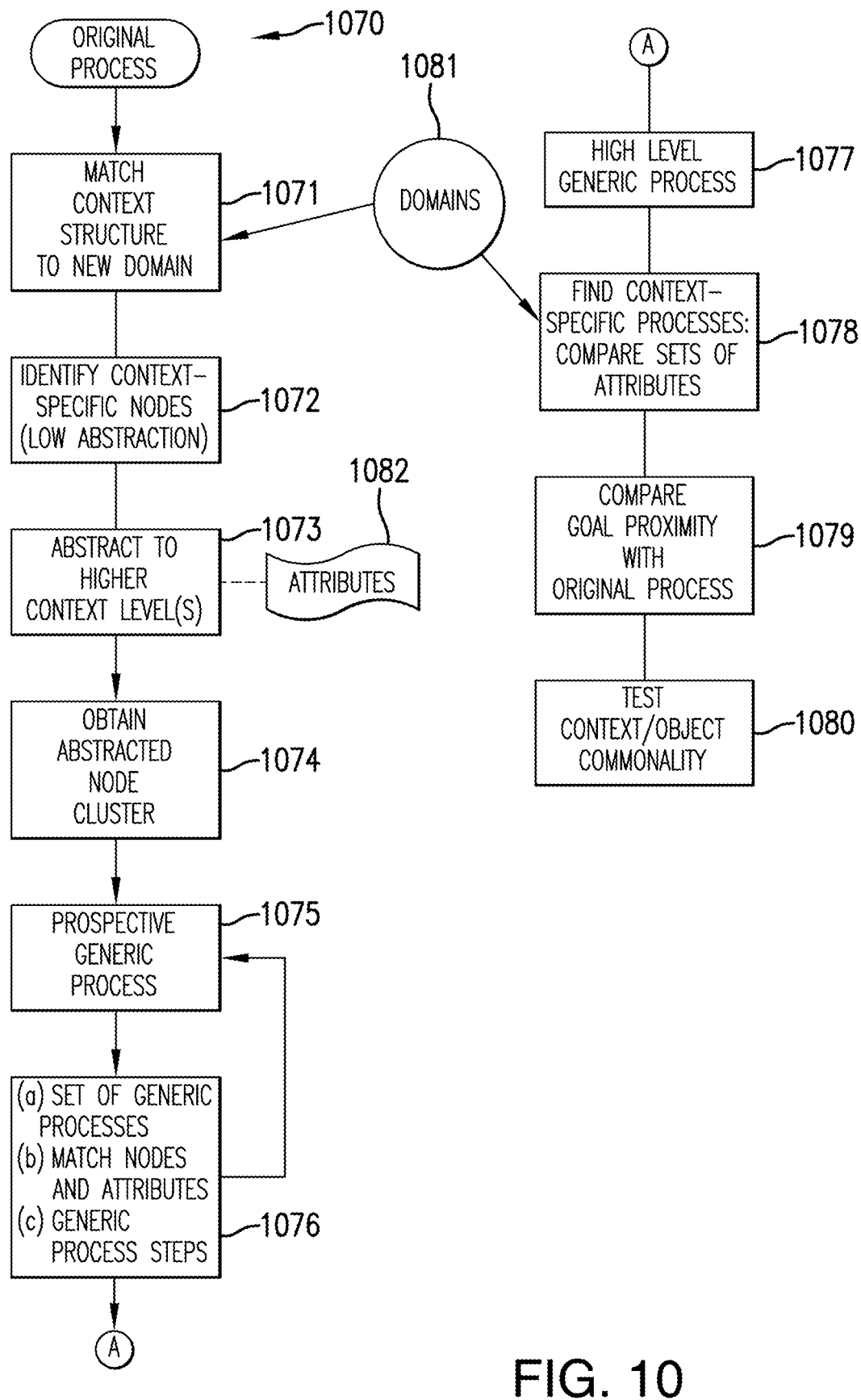
FIG. 10 is a flowchart illustrating a procedure for identifying generic processes and processes similar to a given original process, according to an embodiment of the disclosure.

The following procedure (illustrated in FIG. 10) may be followed by an expert user to identify processes in other domains which are similar to an original, context specific process 1070.

(1) According to this procedure, a generic process is first identified, as follows: The context specific process in an enterprise is taken with its context structure. The context structure is identified and matched to a new domain in which the process will be compared (step 1071). This means the context abstractions chosen need to match across as many domains as envisioned to be working in one overlay system. Then the context specific nodes are identified at the most specific level of context (step 1072). These context specific nodes have been assigned node attributes 1082 by expert users of the overlay using a specific method as shown above. The nodes and node attributes are abstracted to higher context levels by the expert Overlay user (step 1073), to obtain a new abstracted node cluster (step 1074). The new abstracted node cluster yields a higher level generic process (step 1075) which is an abstraction of the original context specific process.

The process that involves the largest number of original nodes abstracted to higher contexts is the highest level generic process related to the original process. The generic process is identified iteratively (steps 1076, 1075): a) by expert users who name that process and assign it to a set of generic processes; b) by expert users who match the nodes and node attributes as described in the method above to verify that the process is unique and does not pre-exist in the set of generic processes by having the same nodes and node attributes; c) by expert users who may break down the prospective generic process into generic process steps, apply the above mentioned process regarding matching node attributes in these smaller constituent steps (with fewer nodes), and then assemble the process from its constituent steps to a larger generic process. However, assembling a larger generic process from smaller ones restricts the level of generality of the process since it will need to have the same constituent steps. The approach of assessing generality of smaller constituent steps is more suitable when the steps cannot be easily changed as in machinery functions and other more rigid processes. Starting with more complex processes with many constituent nodes is more suitable for planning where the process step have yet to be defined.

In other words, the level of process granularity (to which the above methods regarding node attributes and their abstraction into higher level processes are applied) can vary according to the expert user's choice or focus. If the methods are applied to lower level subordinate process steps (more granular) within larger processes, then the process similarity can be taken to higher level processes by goal proximity and matching the number of subordinate processes. If the methods applied are applied to higher level processes (less granularity) there can be process similarities drawn at higher levels with less emphasis on similarity of subordinate steps. Each method has different advantages. The more granular method is better for comparing processes with similar steps and similar goals, the less granular method is best for comparing processes of similar goals but different methods.

(2) Finding a similar process in many different contextually specific domains: After the highest level generic process is identified (step 1077), the expert user proceeds to find more context specific processes of which it is an abstraction. In general, the high level process will be generic to context specific processes in different domains 1081.

To test which context specific processes fit closest, find which context specific processes contain the most nodes which have the closest set of node attributes to those of the generic process (step 1078). This is achieved by comparing node attributes at the various levels of abstraction, starting at the highest.

(3) Apply goal proximity to compare the importance of the common processes in each respective domain (step 1079): This step is more important than the following step in instances where the effect of the process on goals it serves is a more important or more revealing similarity criterion. This similarity tests whether the new contextually specific process has a similar goal proximity to its main goal and conditional goals as does the original process in another context. This includes dependent processes which are potentially affected by the nodes whose abstractions are common between the contextually specific processes being compared. This comes before context similarity when the importance of a process needs to be similar between the processes being compared.

(4) Apply a node attribute test (step 1080) to find the context/object cluster that is most susceptible to the nodes selected. This requires knowledge of the workings of such context and objects across domains (usually a much more narrow range of domains) so as to ascertain the susceptibility to the nodes selected. This step is more important than the preceding step in instances where the context specific obstacles and assets are more important as a relevance focal point, and also in cases where the similarities across context of the nodes of a particular case are more important than similarities of a process. In other words, the selection of nodes is narrower and does not fully satisfy the nodes of a broad process but may group a larger number of processes and contexts with the node of interest in common. For example, most machinery failures have case nodes that apply to particular machines with design, manufacturing and operating criteria that would be susceptible to the same failure. To find these other machines the nodes selected in the generic process selected need to be fewer and the expert user must make the match of node attributes based on knowledge of these other machines and their susceptibilities.

It should be noted that in practice finding similar single nodes across contexts/domains is just as important as finding clusters of similar nodes. In an embodiment, this problem may be dealt with by identifying first and second contexts for the node. The node is specific to the first context, so that the node is characterized as a first context-specific node. The second context is at a higher level of abstraction than the first context, so that the node is not specific to the second context. There will then be two sets of node attributes associated with the node, in accordance with the first and second contexts respectively. At least one generic node may then be identified, where the generic node has attributes in accordance with high context level enterprise node attributes.

Populating the System with Cases

Figure 11:
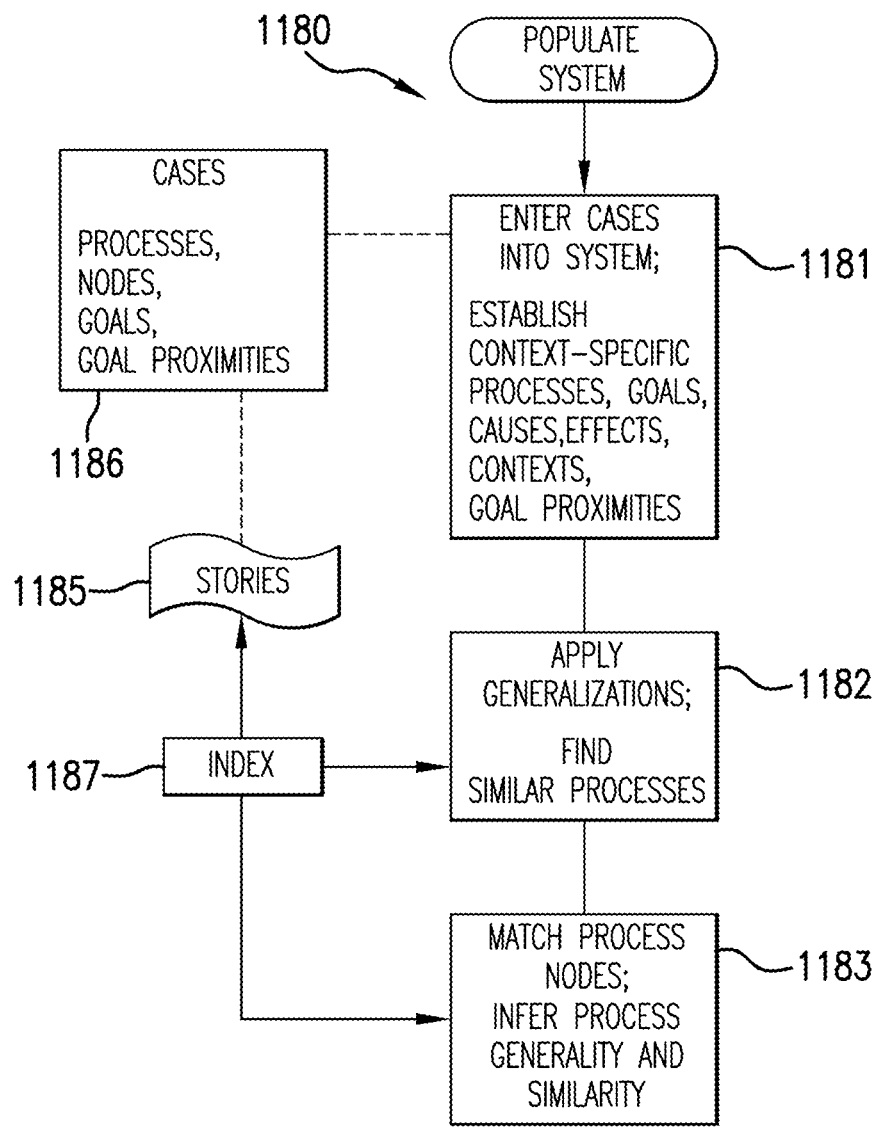
FIG. 11 is a flowchart illustrating a procedure by which an expert user may populate a system with cases or recounted stories, according to an embodiment of the disclosure.

FIG. 11 schematically illustrates a procedure 1180 for populating the system with cases (thereby facilitating solving problems or exploiting opportunities using the Overlay, by making available the collective experience of the enterprise). The user populates the system by entering process, nodes, goals and goal proximities (step 1181). These may be entered using the experience of industry practitioners. Cases 1186 are entered using assistance from an index engine 1187 to index stories 1185 recounted by experts and/or recorded by the enterprise. Nodes are the problems and opportunities manifested in discussions about causes, effects, remedies, and explanations as found in the cases (recounted stories). In this exercise context specific processes, contexts, goals, causes, effects and goal proximities are established.

Abstracting Processes: Cross-Contextual Similarity

In a second stage of populating the system, expert users of the Overlay apply generalizations of processes and generalizations of nodes (step 1182) to enable non-expert users to find similar processes between domains and across contexts. Experts using indexing assistance from the Overlay may match nodes through their attributes to infer process generality and process similarity (step 1183).

Overlay Method Steps

Figure 12:
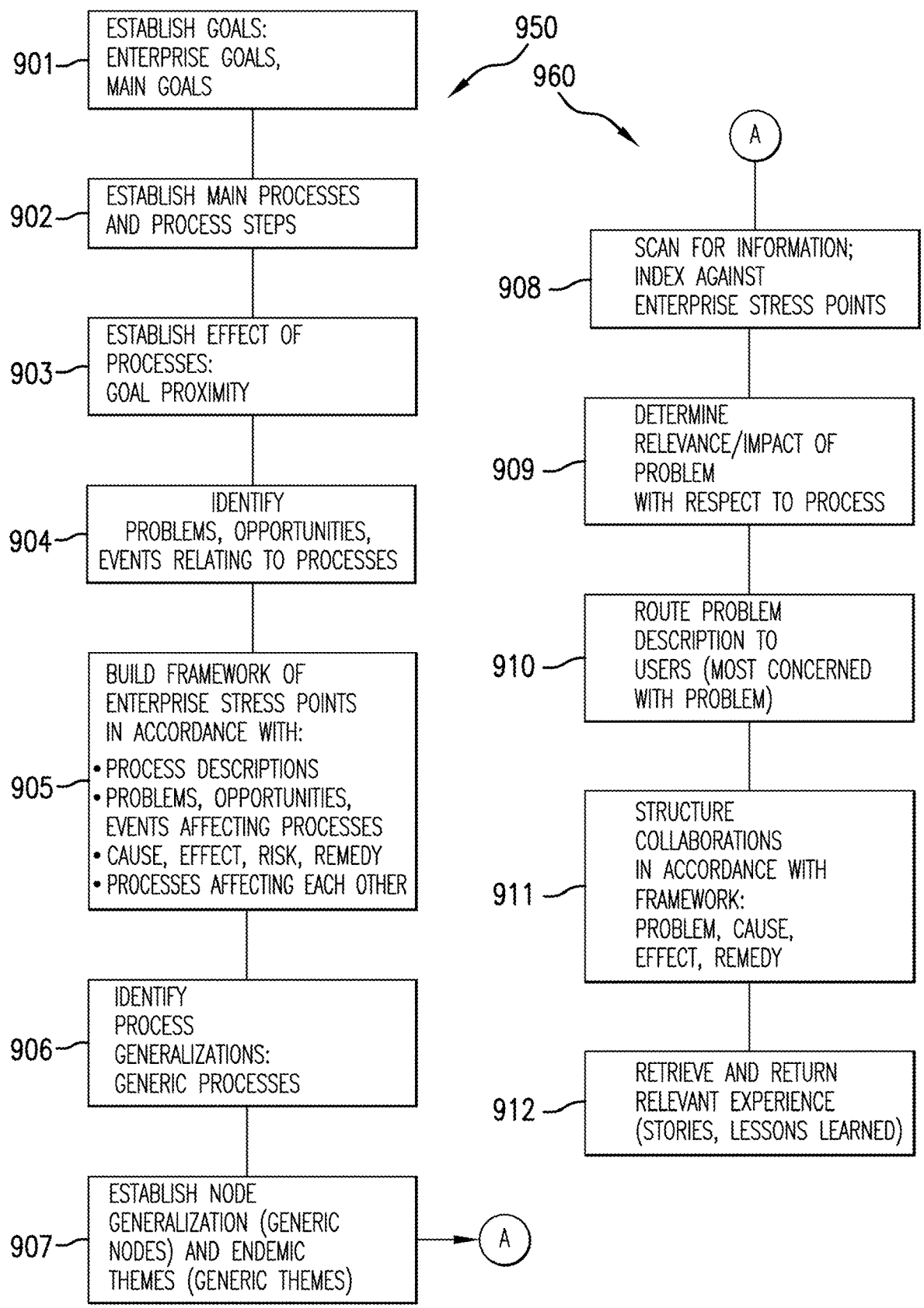
FIG. 12 is a flowchart illustrating a method in which software builds and utilizes a framework of enterprise stress points, according to an embodiment of the disclosure.

FIG. 12 is a flowchart illustrating how the Overlay system finds problems in the enterprise, and provides users with relevant previous experiences; that is, lessons learned from prior risks, causes, effects, and remedies (also called stories).

The method performed by the Overlay is centered around building a framework of enterprise stress points. The goals of the enterprise (enterprise goals and main goals, as mentioned above) are established in step 901. The various processes designed to achieve those goals are established in step 902. The effect of the processes (goal proximity) is established in step 903. In step 904, problems, opportunities and events relating to the processes are identified. In step 905, a framework of enterprise stress points is built, in accordance with: the process descriptions; problems, opportunities, and events affecting the processes; causes, effects, risks and remedies; and how the processes affect each other.

It should be noted that building the framework includes identifying similar processes. As discussed above, this involves identifying common process steps and/or applying other criteria to the various processes.

The processes are analyzed in order to identify process generalizations and thus to identify generic processes (step 906). In step 907, generic nodes and endemic themes are identified from the processes. The enterprise internal content and enterprise data are scanned, and the scanned content is indexed against the enterprise stress points using an indexing engine (step 908). The system determines the impact of a given problem on a given process, and routes a description of the problem to the users most concerned with the problem (steps 909-910). The system proceeds to structure collaborations in accordance with the stress point framework, focusing user collaborations on the key points affected by the problem, the problem's causes, and the problem's remedies (step 911). From the indexed information, the system retrieves relevant previous experience and returns those relevant stories to the users (step 912).

Problem Solving Using the Overlay

Figure 13A:
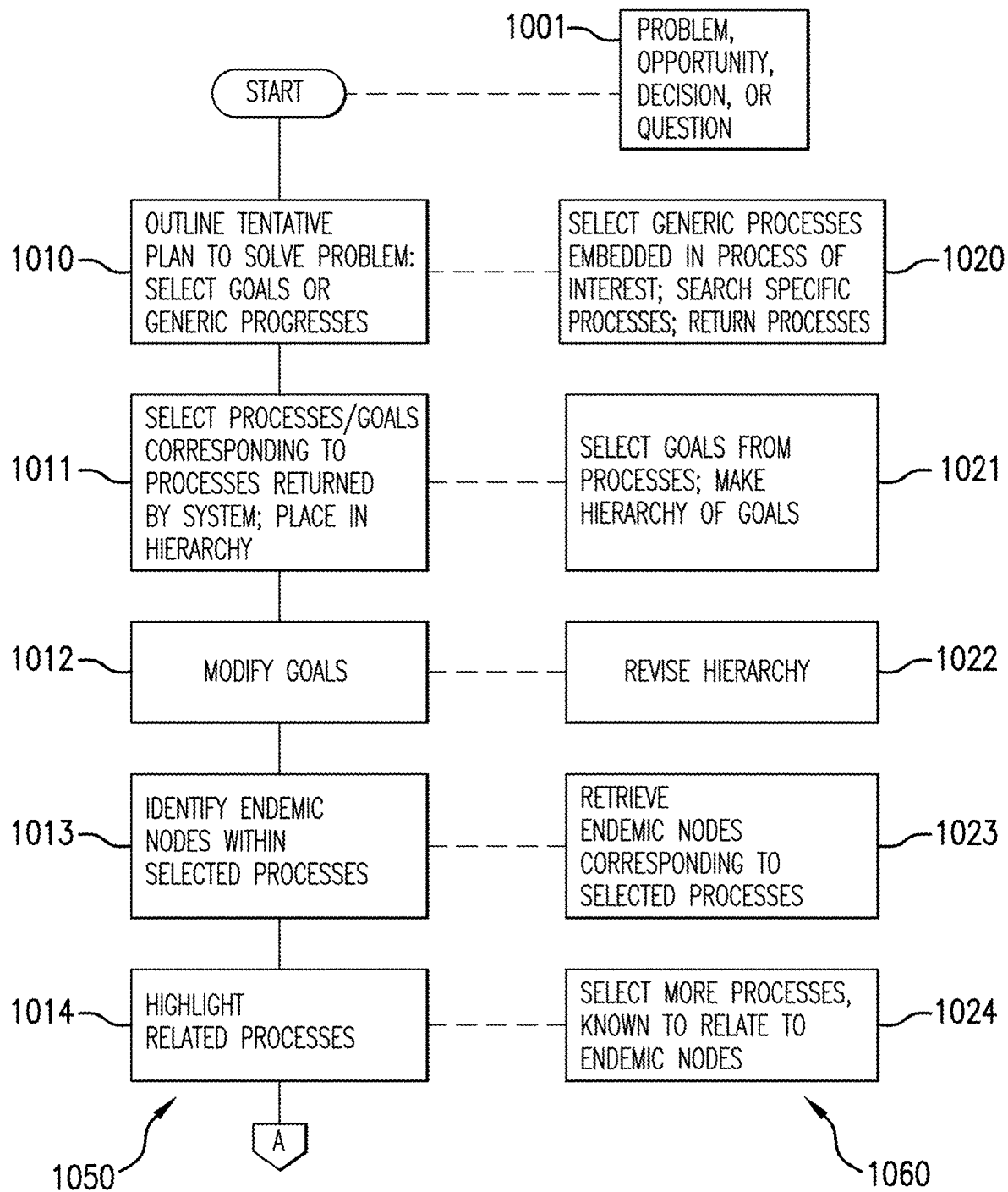
FIGS. 13A and 13B are connected flowcharts illustrating steps undertaken by a user of a system embodying the disclosure, in order to solve a problem or exploit an opportunity.
Figure 13B:
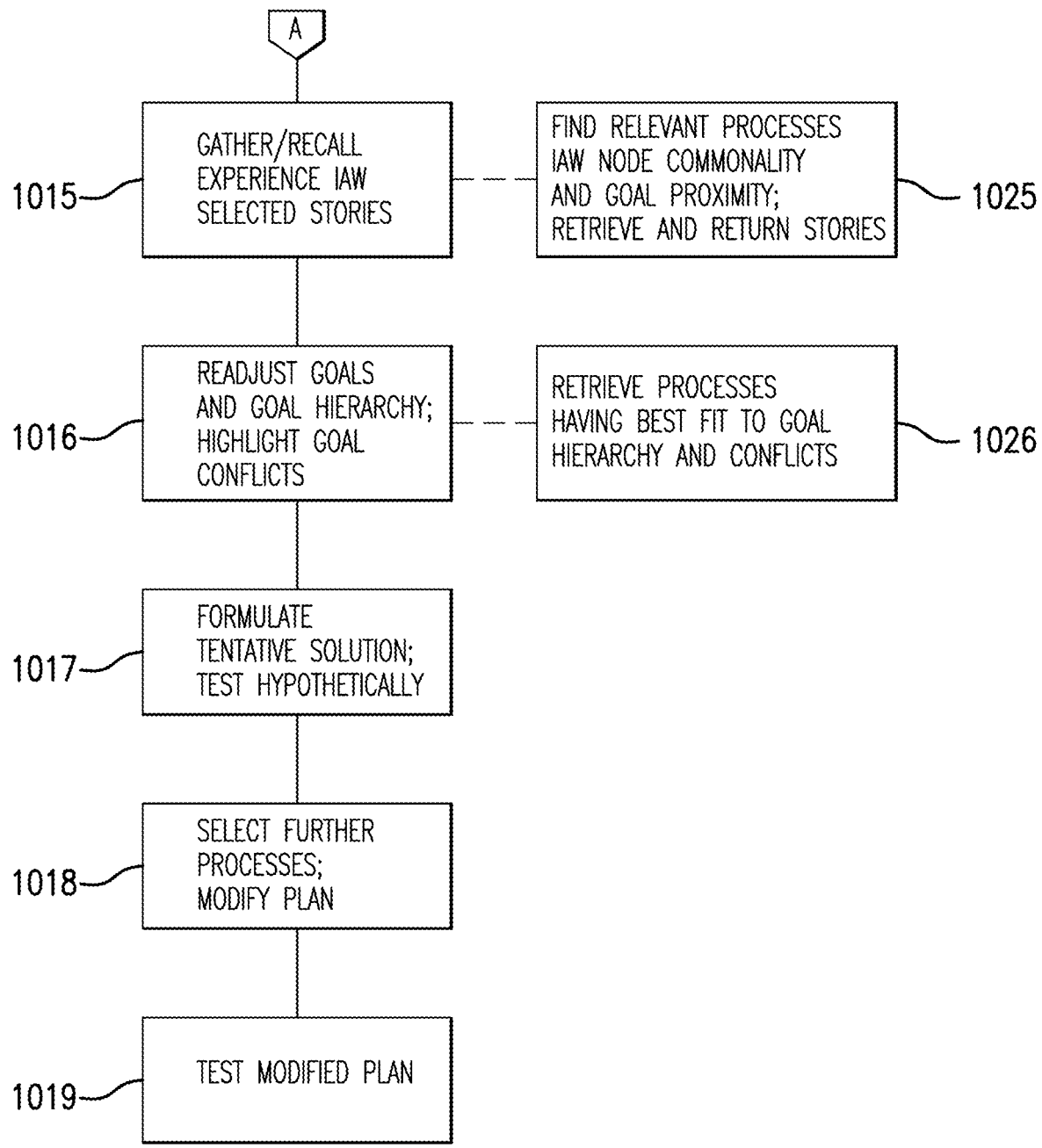

A method for solving a problem (alternatively, exploiting an opportunity, making a decision, or answering a question) using the Overlay system, from a user's point of view, is illustrated in the connected flowcharts shown in FIGS. 13A and 13B.

It should be noted that the method described herein is iterative, and the order of steps depends on how close the problem or opportunity is to a previous problem or opportunity and how well the problem or opportunity has been managed in a known process. If the problem or opportunity is not well known and the process with which it can be remedied is not well established, then the order of steps and emphasis is different from that described herein.

A user dealing with a problem (or opportunity, decision or question) 1001 first outlines a tentative plan in his or her mind around the problem to be solved (step 1010); the plan is devised outside the system. The corresponding system action (step 1020) is to let the user select a few generic processes which the plan organizes. These processes can be returned in a variety of ways by including a set of minor word searches using preconfigured searches on generic processes or goals; in other words, to provide a rudimentary concept search on the cognitive structure. Usually a narrower scope of process selection, resulting in more specific processes, is required than that returned by a goal search, more narrow than that returned by a generic process search, and broader than that returned by a specific process search.

In step 1011, the user selects a narrower set of processes and then the user selects the goals corresponding to the processes returned by the system, and the system makes an initial hierarchy of goals (step 1021). The hierarchy of goals is modified (step 1012; system action in step 1022), taking into account the actors involved in the processes and how their goals affect the hierarchy and how the goals selected conflict with each other. The fewer processes selected (which in turn depends on how well known and established the problem or opportunity is and how well known and established the remedial action process is), the more it is likely that the goal conflicts and hierarchy will be the same as in the process selected.

In step 1013, the user retrieves the endemic nodes within the selected processes (that is, the processes selected in the outlined plan). The corresponding system action (step 1023) is to retrieve the endemic problems for the set of processes.

The user highlights related processes, using the endemic problems; the system selects still more processes, which are known to relate to the identified endemic nodes (steps 1014-1024). The user then selects stories and experiences from the selected processes, which are organized by process problems/opportunities and endemic problems/opportunities. The stories are retrieved by finding a relevant group of processes, according to node commonality and goal proximity to related processes (steps 1015-1025).

As the user gathers past experience and is reminded of his or her own experiences by the stories (content and data related to problems, opportunities and interesting/unexpected events), the system assists the user to readjust his goals and goal hierarchy and to highlight goal conflicts, so as to enable retrieval of processes best fitting the resultant goal hierarchy and conflicts (steps 1016, 1026).

Using the returned stories, the user formulates and tests a tentative solution (step 1017). The user then selects further processes, modifies the outlined plan, and tests the modified plan (steps 1018, 1019). The plan is not necessarily retained in the system, other than described in a discussion with colleagues on a common discussion document managed by the Overlay. The plan may be retained if it is advantageous to do so; for example, if the experience is considered useful for future reference, especially if the plan has a goal hierarchy that under certain circumstances is better than the standard process it replaces. The retrieved stories help the user to devise the best possible plan using the collective experience of the participants. The Overlay helps retrieve past experiences via stories, and helps co-ordinate the right stakeholders in the discussion.

Overlay System

A system for executing the Overlay includes an indexing structure (or indexing engine) which defines methods of achieving relevance between nodes or enterprise stress points. The indexing structure contains word patterns and data patterns including business objects relevant to the nodes or enterprise stress points. The system also includes a language parser and scanners which are used to scan existing or new content and assign that content to process nodes. The indexing structure of the Overlay system helps users find information relevant to enterprise stress points, more effectively than using conventional search engines.

It should be noted that relevance of content in the enterprise is determined exclusively by addressing process nodes. The user defines a cognitive structure to perform indexing; critical criteria for relevance are defined within the cognitive indexing structure.

Figure 14:
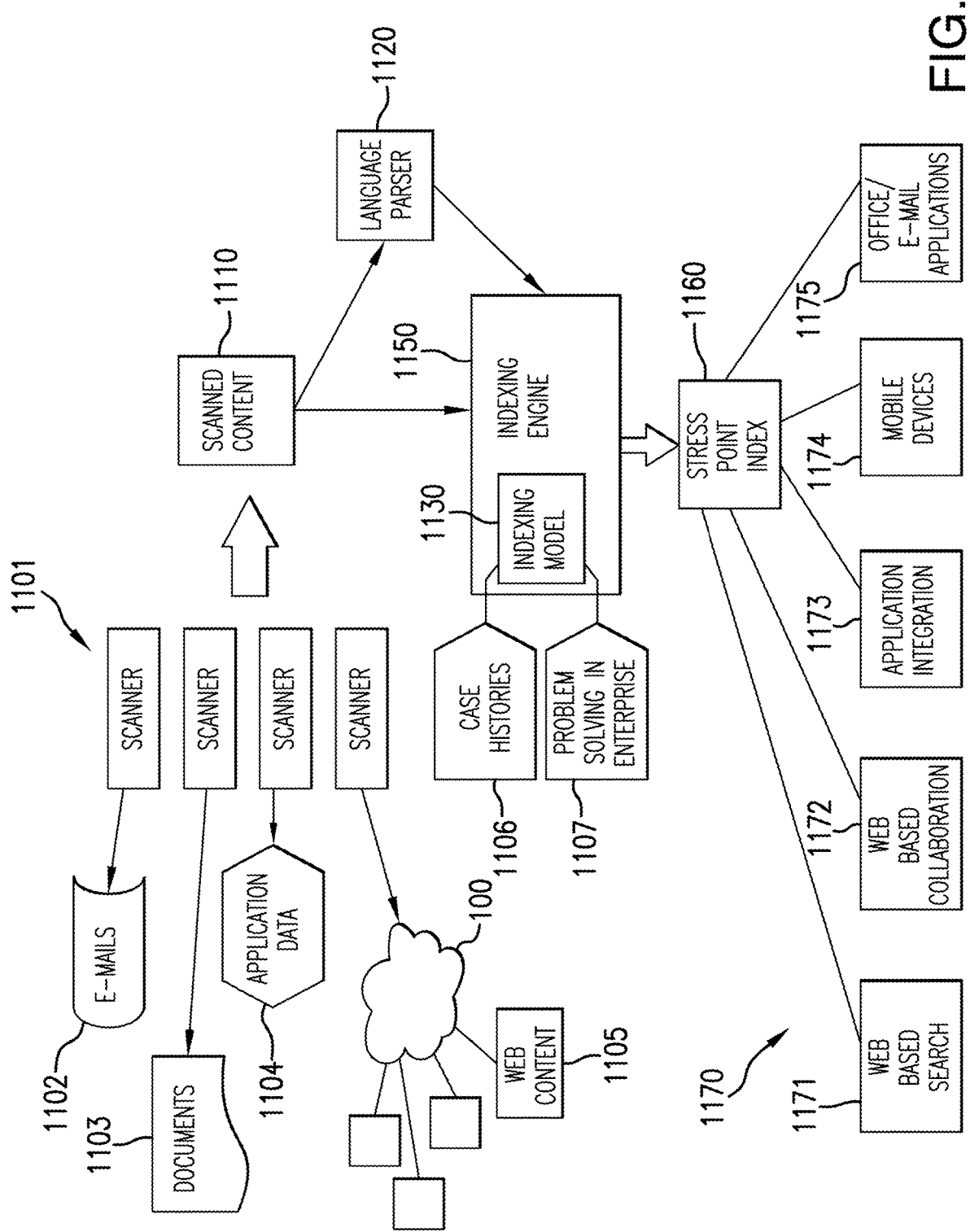
FIG. 14 schematically illustrates a system for gathering information and indexing information against the enterprise stress points, according to an embodiment of the disclosure.

An implementation of the Overlay software, in accordance with an embodiment of the disclosure, is shown schematically in FIG. 14. The Overlay includes content scanners 1101 for scanning enterprise content and enterprise data and related external data as well including business objects; a language parser 1120; and an indexing engine 1150. The scanners obtain content from a variety of sources; for example, e-mails 1102, documents 1103, application data including business objects 1104, and Web content 1105. The language parser 1120 identifies concepts within the scanned content 1110, and cooperates with the indexing engine 1150 to assign a stress point relevance to those concepts. In the case of application data the stress point relevance is preconfigured, so the Overlay looks for specific data in specific locations within the application. The resulting stress point index 1160 supports a range of user interfaces 1170. The user interfaces utilize the stress point index to alert users to problems, enable collaboration between users, restrict the returned information to processes for which the users are stakeholders (even if the information is as yet only directly related to subordinate processes for which they are not stakeholders); and retrieve previous related experiences. In the embodiment shown, the user interfaces include a Web-based search interface 1171, a Web-based collaboration tool 1172, a portal-based interface 1173 for application integration, a mobile device interface 1174 for alerts, collaboration and searches relevant to the problem, and an interface 1175 to integrate the stress point index to one or more desired office applications.

The indexing engine indexes information against the enterprise stress points, using indexing model 1130. The indexing model is constructed using case histories (stories of how the enterprise dealt with stress points in the past) 1106 and current cases of problem-solving in the enterprise 1107. Both current and past cases are thus used to populate the system. Analysis of current cases creates the indexing for the case against the cognitive structure. Past cases can be entered as experiences as a separate process not directly a part of enterprise problem solving.

Furthermore, in populating the system the indexing engine performs cross contextual referencing; this enables the system to be populated with experiences and content related word concepts in new domains, by using the generic aspect of processes and generic nodes from previously populated domains. Context specific nodes define more generic nodes. These more generic nodes in turn define generic components of context/domain specific processes. These generic process components and their generic nodes, will exist in the new domain at some level of generality and thus indicate specific nodes in this different context/domain.

The indexing engine may provide indexing services to other software products, including third-party products such as: content management systems; search solution products; ERP systems; or any other system that would benefit from the addition of stress point relevance software.

In an embodiment, the indexing engine 1150, which is the core of the Overlay, is a middleware service provided via Web services.

A system according to the disclosure may be used to:
identify content relevant to nodes;
understand the enterprise by relating nodes to each other in the cognitive structure;
solve problems in the enterprise; and
find stray information in the enterprise.

Some benefits of using the Overlay system are as follows:
assess process similarity between two processes being compared;
describe processes and plans relevant to the enterprise;
find related information about problems and opportunities;
find stray information (unresolved notices) about problems and opportunities;
assess risk and consequences of problems and opportunities;
anticipate problems and opportunities;
diagnose problems and opportunities;
apply remedial action plans to problems and opportunities;
make strategic plans about problems and opportunities;
give users insight into causes and effects in an industry;
permit users to be creative in dealing with problems and opportunities; aid users in explaining complex phenomena about the workings of an enterprise or the environment in which the enterprise operates and which significantly affects the enterprise;

aid experts assisting companies in solving problems or taking advantage of opportunities for that company; and find relationships between elements of a cognitive structure based on enterprise activities.

For example, on a factory floor users of the system will typically include managers, sales persons, administrative assistants, engineers and maintenance workers all with defined functions and individual goals and a generic goal of delivering product to customers. Many of these users access a model of the enterprise through a handheld device, such as a cell phone, tablet or other personal electronic device (PED). Frequently, these handheld devices have a user interface (viewing screen with touch screen capability) having a limited area. Were the entire node structure of the enterprise presented on the viewing screen, the nodes could be too small for the user to view or access via touching a node of interest. Accordingly, the system is designed to illustrate only nodes of interest to an individual user and, optionally, a few additional nodes on either side of the nodes of interest. As the goals of a particular user changes, the nodes of interest illustrated on that user's viewing screen will also typically change.

Figure 16:
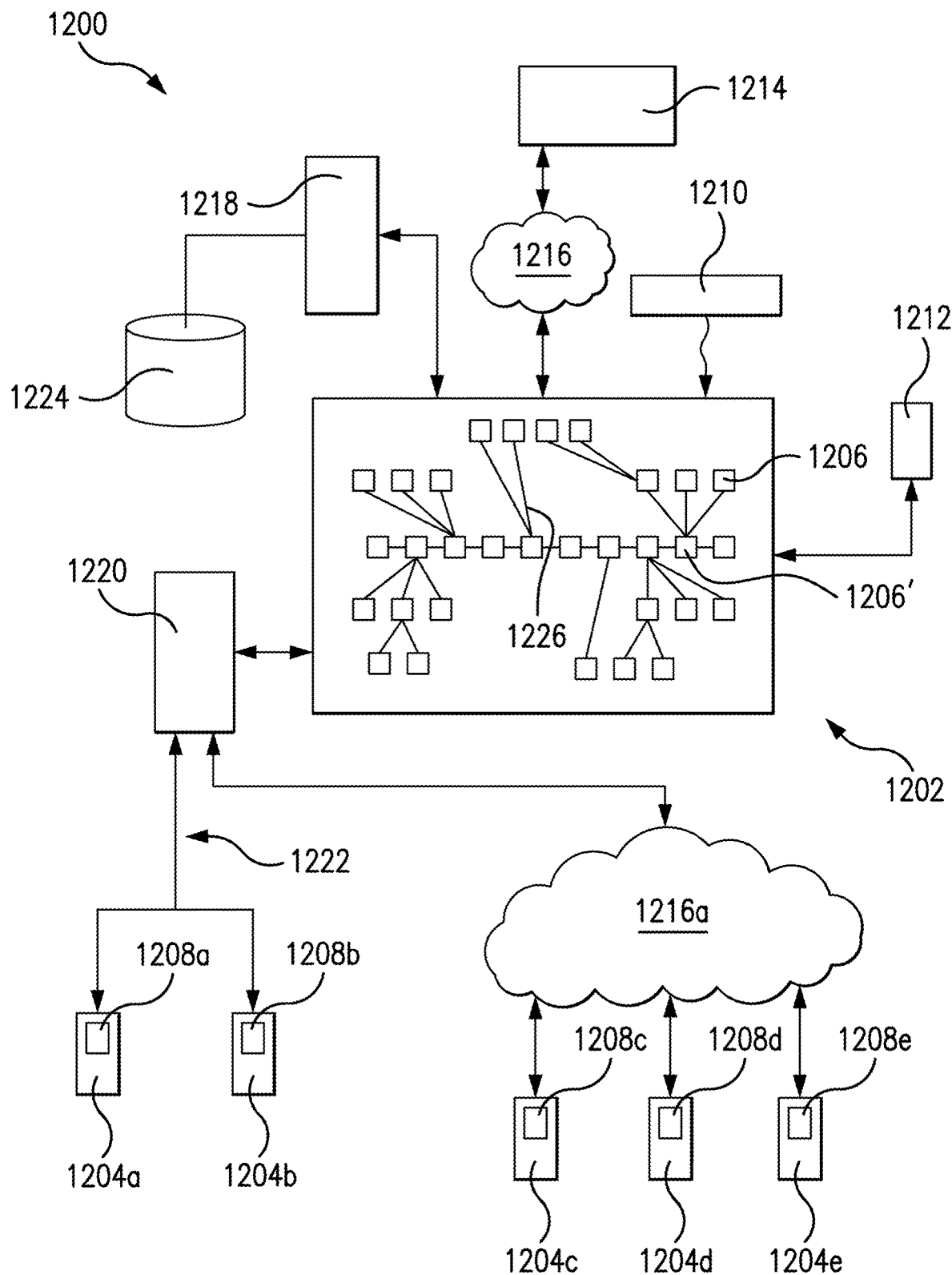
FIG. 16 schematically illustrates a system for use with a plurality of users some of whom have access to displays with limited viewing access.

With reference to FIG. 16, the system 1200 includes a facility 1202 that adjusts a plurality of user interfaces 1204a-1204e to reflect each user's relevant current status of a live event. This means presenting to each user only parts of the interrelated set of nodes 1206 filtered by context associated with that user and that user's current status. Each user interface 1204a-1204e has a display 1208a-1208e having a limited viewing area. Were all nodes 1206 displayed in the limited viewing area 1208a-1208e, the nodes would be too small for viewing or interacting by the user. Also, the current status for a user may change and the system 1200 may be required change the display on that user's interface 1204 so as to allow more space for viewing information relevant to the latest current status. However since all nodes 1206 are related by cause and effect and similarity, the user may revert if required to view any nodes assigned to his stake holding.

The facility 1202 adjusts the user interface to focus on nodes 1206 most relevant to the user/stakeholder and may alter the set of nodes most relevant to a user/stakeholder according to situational developments relevant to the user/ stakeholder. The system may change the user interface 1024a-1204e view so as to allow more space for viewing information relevant to the latest status relevant to the user/stakeholder. However, at the discretion of the user, all nodes relevant to the user are accessible regardless of the current focus shown on the screen.

The facility 1202 communicates with a number of external devices to make sure the information contained and accessible through nodes 1206 is current and the situation of each user is current. One external device may be a keyboard 1210. A second external device may be a remote sensor 1212, such as a temperature or light detector to recognize a fire or a moisture detector to recognize a leak or burst pipe. The facility 1202 may also remain in contact with remote sites 1214 via the Internet 1216. Such remote sites may include, without limitation, other divisions of the enterprise, external databases (for example a government site for access to building plans or wiring diagrams), public databases (for example search engines) and private databases (for example schematics for a ship or a piece of equipment available from the builder/manufacturer).

The facility 1202 includes a computing device 1218 having a computer-readable medium with executable instructions encoded on non-transient digital storage medium, the non-transient digital storage medium also storing a model of the enterprise, content of the enterprise and data of the enterprise, wherein processes associated with the model include nodes, a computer readable description of relevance between different nodes, and a computer readable description of relevance between content and data and the different nodes.

The facility 1202 is able to communicate with each user via transmitting device 1220. The transmitting device both sends and receives information from each user through the user interface 1204a-1204e. Any form of communication may be utilized, for example a cellular network 1222, a wireless local network or the internet 1216a. It is useful to instantiate nodes 1206 not only from changes in underlying information in a database but also via user direct input to a user interface 1204a-1204e controlled by the Overlay. This will still be treated as information in a database or other computerised facility to be processed by the scanners etc., but the information will be entered via a user interface controlled by the Overlay. This information may be a simple selection of a node 1206 rendered in the user interface, or selection of choices of user instantiated actions related to a node 1206 and/or content entered by the user. Some information, such as pictures and videos, can be made available by the facility 1202 on the displays 1208a-1208e of the handheld devices or via the handheld devices. User instantiated action can be entered by the user into the facility 1202 via the transmission facilities 1220, 1216 and the computing device 2018.

The user interface 1204, the interrelated node 1206 structure and the data in the database 1224 exist as one middleware service. This middleware service allows the logic/code to be modified and the database 1224 to be modified and the nodes 1206 to be modified without requiring any programmatic change to the user interface 1204.

The Overlay incorporates a set of interrelated nodes which are connected by cause and effect and similarity. The cause and effect can be determined also by formulas and relationships between properties related to nodes. In conventional programming, changes are made to relationships and to data representing problems and opportunities. After these changes are made, new user interfaces need to be designed to present these new relationships to users. The present embodiment bypasses the second programming exercise.

Coded relationships 1226 between nodes 1206 can be explicit and if all nodes are connected to other nodes by programming code/logic which depicts cause and effect and derivatives of cause and effect, then changes in the nodes and their connecting formulas, programming code/logic can be made without also changing the relationships of information rendered on user interfaces 1204 in a separate exercise. The system 1200 builds a database 1224 where each increment of data is related to at least one node 1206 and the relevance of one node 1206 to another node 1206' is described by the code/logic that relates one node to another. The nodes are related to each other by application code/logic which depicts cause and effect and derivatives of cause and effect. Data from the database 1224 relevant to each node 1206, 1206' can be displayed on the user interface 1204 limited area display 1208 in groups corresponding to nodes which are directly linked to each other. These nodes are related to each other by cause and effect and derivatives of cause and effect.

The user interface is a continuum that is not designed programmatically for the use case at hand. Prior art user interfaces are designed to fit fixed pre-determined use cases. For example there could be a user interface to determine the exit route in a burning building by providing a fixed choice of navigation options. A different user interface would be needed for exiting the building plus a nested emergency such as a broken leg. A different user interface would be needed for the co-ordinator who oversees the status of location of the evacuees. The overlay user interface fits all use cases including future unanticipated use cases because the user interface is derived from a continuous node structure that contains the logic of the system and accommodates the future logic. Furthermore since the logic of the system and the state of each attribute of the system are depicted by the cause and effect link between nodes and the nodes respectively, there are only two variables to describe; the node and the link to another node. This can be depicted graphically in a topographical map similar to a vector map. But allowing this topographical depiction due to only having two variables, node plus link to another node, plus the ability to expand or collapse child nodes under parent nodes, then an increasing and a decreasing number of nodes can be shown on the user interface allowing users to combine a zoom out situational awareness and a zoom in focus on a particular node and its related information. There is currently no user interface depicting any group of processes regardless of whether these processes are sequential or not and regardless of how they are related to each other and regardless of how many processes are depicted, that is graphical and that allows navigation from a choice of thousands of nodes to a focus on any one of the lowest nodes in subordination and any selection of nodes between these extremes and to do so in a continuous depiction.

Although the view that the users may want to see in the zoom in mode, may become a view of attributes of nodes and links rather than nodes and links between nodes themselves, these attributes are still generated dynamically by the nodes and links upon which focus has been applied. There is no programmatic generation of attributes to be viewed. The node attributes in a detail interface are generated dynamically.

This is contrasted with prior art enterprise process depicting User Interface software, which requires each user interface detailed or otherwise to be predetermined and then programmatically generated. One of the examples in existing software systems that are not depicting enterprise processes but are continuous are electronic maps. Electronic maps can increase or decrease focus by zooming in and out. But there is no ability to present processes in this way because the view of the map is not used to depict processes and relationships between processes but is used to depict positions and distances in two dimensions. In the Overlay, by contrast, the space is used to depict cause and effect links and processes. In other words, the nodes depict problems and opportunities and the links depict the cause and effect that is linking the nodes and the space is used to indicate subordination or dependency. The salient feature that enables this is the fact that processes and representative nodes converge, that is child nodes collapse into parent nodes, thus fit within each other when zooming out. Flow charts and similar process diagrams are used to depict processes from fine grained, to large enterprise systems. But flow charts depict sequential processes and decision points which do not fit within each other so as to allow zooming out.

Process sequences are often too fine grained to define all process relationships in a practical manner. How, for example, do you define how an audit failure affects corporate reputation in sequential steps? And in so doing is the sequence important or is the cause and effect important. How does a misaligned ball bearing affect a machine's structural integrity? How does a flow chart with sequential steps help depict this? A link between two processes that are not linked sequentially can be linked in a flow chart but the link is no longer a depiction of process flow and cannot be depicted as a component of a flow chart.

Other hybrid process depictions can be made on two dimensional UI format but they do not contain explicit cause and effect relationships between nodes that are also computer readable and process nodes that also converge and in the graphical depiction fit within each other to enable zooming out and also fully depict the relationship of one process problem or opportunity to another as required by the scope of the depiction system for which they have been designed.

In other words, prior art hybrid flow charts attempt to depict process relationships and not just process flow, but fail to provide nodes that converge so that detail processes can be converge into parent processes with explicit and full cause and effect relevance between nodes that is computer readable and thus able to be processed by computer. Therefore when depicting interrelated enterprise processes in a user interface, these prior art hybrid flow charts, can show processes but not the degree of relevance between processes sufficient to allow convergence. This is because the nodes do not converge and relevance is often undefined or in some cases statistically defined by user communities. By contrast in the Overlay the cause and effect relationships are either depicted empirically by goal proximity or by an algorithm in the cases of more quantitatively explicit relationships as mentioned herein. Both goal proximity and relevance algorithms depicting cause and effect are computer readable and are able to depict the importance of a relationship. Statistically depicted relationships are computer readable but they are not necessarily accurate especially when the results are aggregating cause and effect dependencies which could be insufficiently independent, the statistical samples are aggregating results with completely different causes thus obscuring cause and effect, or statistical samples are insufficient for a meaningful statistically derived relevance.

For example ships collisions statistically analysed and assigned to human factors such as human errors are insufficiently meaningful since every technical aspect of marine transportation that could also be the cause of a collision such as a steering mechanism failure is also involving human factors in for example, machinery design, manufacturing, maintenance, operational complexity, etc. With undefined relationships or statistically related nodes as in the prior art, the user interface would be cluttered with undefined or statistically derived relationships between nodes. In an emergency for example, these relationships would cause confusion and effectively defeat the purpose of the entire computerised application for emergency response which is to provide relevant information with minimal distraction.

In another prior art method of graphical two dimensional depiction used for formal risk assessment commonly called "bow tie" diagrams, relevance between "failure modes or hazards" and processes is depicted in statistical probability and "severity" connections between nodes. But since there are "failure modes or hazards" and "processes" and "goals" and links between them but often also "conditions" and other variables, the element do not converge. A "risk" a "hazard" a "barrier" a "consequence" etc do not converge as do process nodes in the Overlay. In an emergency such a conventional "bow tie" depiction would not for example show the whole situation. It would represent failure nodes and hazards but what if the user wanted to see other processes that are affected by hazards depicted in the bow tie diagram, or other contributors to the consequences in the bow tie diagram or other processes to focus on. How would those be connected? A bow tie diagram only shows at best a set of affected processes and causal hazards plus logical derivatives related to one process or hazard that is in focus. There is no notion of how all processes in an enterprise are connected. So in an emergency, if the user needs to view another process in his or her stake holding or if the system helps focus to a latest event, it would not be possible without rendering another graphical depiction different from the previous one and not continuous. Therefore the graphical depiction will not be continuous and cannot be used to zoom in and out. This in turn makes it impossible to depict any process in the system and any future process without prior design of a user interface for each process or use case or user/system interaction point.

Therefore the prior art system cannot dynamically generate user interface depictions for any process or group of processes emulated in the system, either a current process or group or a future process or group.

The above serves partly to explain the below:

Enhancing or replacing underlying enterprise applications using the Overlay principals:

One of the ways of enhancing the understanding of the workings of an enterprise is to shorten the time it takes to enhance and occasionally replace underlying enterprise systems in their role as information sources for hosting event triggers regarding problems and opportunities and interesting or unexpected events, or missing important monitoring elements, and also the relevant information that enhances the decision making of the user.

The reason for enhancing or replacing these underlying enterprise applications is that often these system are old and outdated, or poorly designed ergonomically so are rarely updated in time to provide the right triggers and relevant information for the Overlay to work effectively.

For the Overlay to replace these enterprise applications without vast efforts in application building such as understanding the legacy code or maintaining the legacy code or improving the legacy code, there is a need to use the core innovation of the Overlay for legacy system enhancement or replacement. In other words to facilitate the creation of supplementary enterprise information systems when required.

An important objective is to allow the supplementation or creation of these systems without having to resort to traditional software development methods, thus allowing business domain experts, that is to say stakeholders and experts in the domain, to build with less of a requirement for traditional application building methods. This significantly improves the likelihood that the resulting system will be effective and also increases the speed at which systems can be built and adapted to suit new and emerging requirements.

The behavior of Overlay based systems is in part driven by the node structure and in part driven by traditional data structures within underlying enterprise applications. Those aspects of the system that are driven by the node structure, which generally relate to system navigation and relationship between nodes, that is to say finding the information of relevance to the user in an enterprise, are highly flexible. Those aspects of the system that are driven by traditional code within the underlying applications, which generally require creating and interacting with business objects, remain difficult and expensive to change and are unable to readily exploit the evolving business model as defined by the domain experts. This latter situation means that Overlay systems remain vulnerable to the quality and fitness of purpose of the underlying legacy applications.

The following section discloses an embodiment of the Overlay concept, which is the elimination of the need for traditional code and thus seeing all system behaviour being driven by a newly extended node structure. Conceptually speaking, the business model thus becomes the code of the application. This will enable Overlay systems to meet the objectives outlined above.

In prior art and in legacy systems, the business object acts as the 'atomic unit' that can be manipulated by the business model—i.e. moved between transaction tasks, accessed via navigational filters, and so on. These business objects generally represent convenient packages of data—sets of related attributes that model a real world object or concept, such as person or document. It is these business objects that are currently implemented using traditional code. These business objects contain attributes and relationships to other objects derived from many use cases. Rather like a home improvement tool with accessories to fit many home improvement jobs. However because of the multiplicity of uses of business objects, which are orders of magnitude more numerous than with home improvement tools, and almost as many as the variety of uses of modern smart phones and computers, describing the attributes and relationships to other business objects is cumbersome and difficult for designers to envisage and manage.

For example, packaging up attributes into business objects is the fact that these attributes and their values tend to be determined by complex underlying processes and are subject to rules and constraints that span out across the enterprise (and indeed into other enterprises) that software engineers are generally not aware of while the system is under development.

For example, take a simple line item of a spares purchase order:

The part number: how the part is described stems from a complex process that probably traces its roots back to the original manufacturing process.

The quantity required: this could be determined by a complex set of conditions, including the state of the machinery for which the item is for, forthcoming maintenance, the availability of time, labour, money and other resources.

The required by date—again, this could relate to the availability of resources, accessibility of the equipment, how and when the equipment will be used.

The planned delivery date—this could relate to the availability of supplier's personnel to prepare the item for delivery, which it turn is related to the personal and professional requirements of the personnel in question.

In short, the simple business object of a purchase order line item would traditionally only capture a fraction of the above—yet the mapping of the above into the complex cause-and-effect node structure is essential to deliver an effective business process support system—one that will aid effective decision making and be easily extensible by extending the nodes structure.

The challenge is particularly acute when the 'ideal' business process cannot be followed—i.e how exceptions are handled. For example, if the part cannot be delivered on time, the actions that need to be followed may depend on very complex information such as the predicted reliability of the equipment that would allow the risks to be assessed and mitigating actions taken.

In addition to this, there is the very common scenario of business object implementations not readily meeting the requirements of different enterprises that naturally tend to have different interpretations and usage patterns with regard to them. Business object implementations effectively encapsulate business logic that should reside in the model and not in the code and are rarely developed in such a way that this logic is exposed to the business model in a way that the model can control how the business object behaves.

A central tenet is thus the removal of the notion of the business object as a fixed concept and instead the adoption of the attribute as a more finely grained unit of atomicity. This will in effect allow for a new and highly dynamic type of data view, based on the node structure of nodes interrelated by explicitly described computer readable cause and effect or derivatives or variations of cause and effect, manifested in computer readable logic, which will replace the business object concept, the separate transformation logic and the separate user interface logic that has become the hallmark of existing prior art systems.

A further tenet of this evolution of the Overlay/TA system is the explicit combination of the process model, as manifest by the interrelated node structure, with the data model, defined as attributes. It is this combining of data with interrelated nodes connected by cause and effect, that is to say explicitly showing what the data is for and how it is transformed, which is central to the ability of the system to host meaningful computer readable transformation logic and meaningful user interface attributes without special programming skills. This is in contrast to traditional data structures, such as relational databases, that lack an explicit representation of what the data is for (i.e. the goals that it supports) and, as such, lack the resolution required to derive a suitable user interface. It is traditionally this information that is embedded and thus hidden and fixed within the code and which needs to be made explicit within the model in order for experts in the real world processes and computerized transaction processes, to be able to understand all the computerized processes within the enterprise application and extend them when needed.

Unlike other no SQL node structured databases, the unique concept of the Overlay in building or extending enterprise applications is that all the transformation logic lies within the cause and effect links between nodes and no other logic is needed to effect either the application transformations or the user interface attributes. There may be logic outside the nodes structure needed for ancillary services but none of the enterprise business logic or user interface attribute representation needs to be outside the node structure.

Modern information systems can generally be seen as a number of tiers, each fulfilling a particular type of function and providing services to the adjacent tiers, and the Overlay/TA concept is no exception. The next generation Overlay/TA concept has three tiers, outlined below:

The user interface tier. This tier renders the interface to the users of the system and is wholly derived from the business model.

The business logic tier or 'middle' tier. This tier defines a representation of how the system should support the user and the organisation in their desire to meet their goals. It consists of a business model running within an implementation framework that is the Overlay.

The data management tier. This tier facilitates the storage of state information and again is wholly derived from the business model.

The Business Logic Tier

As stated above, this tier consists of two principal elements: the business model and implementation framework within which that business model executes. The business model is created and managed by non-software engineers that is to say that knowledge of traditional programming languages and database systems will not be required. The business model will therefore define everything required to derive a meaningful information system, i.e. one that supports the organization in meeting its objectives. The key challenge therefore becomes supporting the definition of a model that is readily understandable to non-technical people while at the same time remaining unambiguous enough to be processed by the underlying implementation framework and still deliver a predictable, meaningful and usable end result.

The heart of the Overlay business model is the node—an enterprise stress point where a human operator, or alternatively a sensor or other system agent, needs to make a decision and provide input i.e. a change in state or where a user needs to be made aware of something by the system. At a high level, the collection of these nodes defines the process model of the organization, which when combined with an underlying state model, should provide enough information from which to derive the user interfaces required to support each enterprise stress point. Elements of the process model can be mapped to higher level generic process abstractions in the master process model. We will now describe each of the components in more detail.

Business Logic Tier: The Process Model

The process model is defined as an interconnected collection of nodes. Each node has a collection of attributes which are input into or output from the node. Nodes are principally related to other nodes as cause-and-effect, although other types of relationships also exist and are outlined below.

A cause-and-effect relationship between nodes implies that an action, either explicitly or implicitly as a result of the input or existence of data, can be invoked by the user or other agent as part of the causal node that will trigger a change in state that in turn renders the affected node as 'of interest'. The 'code' of the system, which is linked to the action, which in turn is linked to the cause-and-effect node relationship is thus focused on effecting changes in state as a result of the invocation of actions.

A node is related to the collection of attributes that are linked to the nodes within that node's 'node cluster'. A node cluster is a collection of related nodes, typically related by process but also for other reasons, and is defined explicitly by the domain expert creating the model. Within each node, attributes are designated as either input (read-only) or output (read-write). The collection of attributes for a node can be referred to as the 'predicative pattern' for that node.

Nodes are essentially stateless in that they consume and produce classes of attributes. In other words, there is no notion of node instantiation. Instead, nodes become of interest as a result of the state of input attributes to those nodes. For example, the node 'Evaluate sourcing and transportation options' becomes of interest when there is an outstanding need from the vessel that is to be fulfilled. This change in state is typically a result of the invocation of an action associated with a causal node.

Nodes can also be related to other nodes as belonging to the same area of concern—i.e. as tasks within an organizational task grouping. These organisational relationships do not necessarily imply membership of the same node cluster by direct cause and effect, but rather are used to aid the user in navigating what can become complex node structures. For example the node "Procurement" which organises many procurement processes has no cause and effect link to the processes it organises or any other processes. This is because it is unclear how such an organisational node is affected by the nodes it organises or how it affects other nodes. That is, if one asked the question how does "procurement" fail or when is "procurement" at risk, the answer is imprecise. Likewise if we ask the question what process fails when "procurement" fails. However the finer grained nodes within this grouping such as the "inventory status of a ship" with respect to a spare part can have very precise effects on the ability to perform a repair on board. So these organizational nodes such as "procurement" exist for navigational purposes whereas the nodes organized by these nodes have the normal cause and effect links to other nodes.

Business Logic Tier: The State Model

This is the place where data is stored to allow users to share information and to allow the system to 'remember' things between user sessions.

When an attribute is identified as part of the process model, the state model is automatically extended to facilitate the storage of values for that attribute.

State model attribute values may also contain a link in the model via a node to a further attribute value to indicate a relationship. For example, age and name attributes may be linked to an employee ID attribute to collectively represent an employee and this may be represented in a node cluster. At a class level, the types of relationships that exist are derived from the process model (node clusters), typically as a result of attributes being part of the same cluster serving a larger emulated process or parent node.

A key mechanism here is the context component of the Overlay interface. Attributes used for contextual filtering, that is system navigation using key identifiers, become 'key' attributes. A key attribute forms a primary navigational approach when many similar processes are differentiated in their cause and effect by a key identifier and when many related but different process steps use the same key identification. For example, if an employee name is defined as a key attribute, it becomes possible for the system to link employee age attributes to the name if each of these attributes form two nodes in a larger cluster identifying an employee. The key attribute and the use of the key attribute for system navigation helps make sure when processing employee details we are focusing on the right employee if there is more than one, while the process steps are the same for all employees.

This approach to state management represents an important departure from conventional systems in that by removing all domain specific knowledge from the data model and having it derived from the process model, we help to avoid the sub-conscious transfer of prevailing information system design assumptions into the new design which may impact the ability of the system to present precisely what is needed to complete the process at hand.

Business Logic Tier: The Master Process Model

Nodes, where possible, are related to node classes (abstracted node clusters depicting abstracted processes) as instantiations of those node classes (abstracted node clusters), which are defined by the master process model. Node classes capture the common elements of domain specific nodes as abstract versions of those nodes. For example, node classes may cover concepts such as plan, check, approve, warn and so on. It can be said that abstracted node classes represent concepts that would be familiar to 'a cave man' in that they are among the first abstractions that we as humans have come to realise.

Abstracted node classes serve two main purposes. First, they serve as guidance to business domain experts when considering how to model domain specific issues, for example by reminding them what issues need to be considered and by helping individuals understand the work of domain experts. Second, they accelerate the modelling process by facilitating reuse and enabling the rapid identification of similar processes across a domain model. Reuse however may not be direct copy paste of generic code components and more likely involves an adaptation of the node class (abstracted cluster) to all the instances/use cases. This is because an abstracted or class level cluster is not always easy to describe in appropriate coding language that can converted without adaptation to a domain/use case level. However the linking of the domain cluster to the node class (abstracted cluster) can be very explicit thus making it very clear where to cascade class level improvements in logic to domain/use case level.

The User Interface Tier

The user interface tier combines information contained within the business model with an encoding of best practice user interface design principles to render graphical user interfaces to the user.

The existing prior art uses business object as the principal division of concept with the UI. In other words, users create and open up views on business objects to view their contents and make changes as necessary. The Overlay sees a radical change in approach here in that the principal interaction UI concept becomes the node itself. Users open up the node UI to view information required to perform the process and capture information to update the state model.

Node UIs essentially present the input and output attributes of the node in question and the surrounding nodes i.e. the node cluster. Attributes identified as input are read-only while output attributes are read-write. Attribute values are grouped where necessary and are dictated by the process model as described above.

The number of attribute values in existence dictates the format of the presentation and the availability of supporting navigation tools (such as sort, filter and search)—if there is a lot of data the UI will thus dynamically adapt to suit. Attributes may be highlighted as key attributes for the node which in turn may affect how they are presented in the node view.

For nodes with large numbers of output attributes, the system may resort to a two-step UI model based upon an initial key attribute list and an attribute set editor, but in both cases the UIs must be dynamically generated. An example of this would be a purchase order where the first UI step would present a summary of the relevant key attributes (date, supplier name, order identification, recipient) and the second step would be a more complex UI that would cater for the full Purchase Order header and all the line items.

As well as determining which attributes are relevant, cause-and-effect relationships between nodes also have an impact on how those attributes are presented. For example, visual emphasis may be applied to attributes which are affected by cause-and-effect relationships which are directly related to the node in question or a node cluster view which provides a single UI that captures multiple cause-and-effect relationships. The platform formulates a UI approach that suits the decision or decisions or transactions to be made.

Attributes can also be determined as relevant if they are deemed necessary to bring context to attributes that are deemed relevant by the node structure. For example, if machinery component name is identified as an input attribute, the system may also deem vessel name to be relevant.

These key attributes can be used to delimit the view into a data structure suitable for grid display. In this example, the name of the ship will accompany the machinery component as the sister node to the identification node in a transaction titled "data population master setup".

Data Management Tier

The data management tier translates the state model within the business model into an implementation framework provided by an off-the-shelf database management system. The need for scalability and the absence of a need for a formal relational database structure, since the underlying schema will by necessity be a meta-model to support on-the-fly extensibility, means that it is likely that data will be persisted as key-value pairs. In turn this naturally lends itself to the use of NoSQL database systems, such as CASSANDRA (The Apache Software Foundation, Los Angeles, CA). This approach reduces the likelihood of the underlying data management schema becoming a hindrance to system performance.

There are many other types of computational logic that go into information systems beyond simply presenting data and capturing inputs. We will now start to briefly consider how some further types of computations can be covered:

Attribute Creation and Deletion.

As discussed in the state model, actions that lead to the creation of a new attribute will trigger the execution of constructor functions that may create and populate the attributes and other related attributes. Attribute deletion needs to be supported by a special hard-coded action type that takes an attribute as a parameter from the node UI. It should also be possible to define destructor functions that contain logic that check the validity of the deletion.

Event Handling.

As well as constructor and destructor events, it should be possible to define action code for system and custom events. For example, when a node view is opened, viewed edited and so on. Custom events related to action code initiate when a change in state occurs. This can be seen as similar to a database trigger but is represented in the node structure as a reusable abstracted process albeit at a very detailed level associated with transaction type processes.

Access Control and Security.

Access control is inherently provided as part of the role-node-user-context structure. There should be no need to overlay this structure with an additional access control layer.

Computed Attributes Computer Readable Cause and Effect.

This is a central concept to providing computational support to users. Fields that are computed are defined as the product of a script, which may include but are not limited to programmatic constructs such as mathematical operators, logical operators, condition/selection, loops etc. Computed fields are typically updated as a result of the actions that trigger the transition from causal nodes to effected nodes.

Systems Integration.

The node structure concept at the heart of the overlay model provides a useful framework with regard to the issue of the integration of disparate information systems—both from process (or user) integration standpoint and from a simpler data integration standpoint. We can look at each of these in turn.

Process integration can be seen as the transitioning of information between processes that are not emulated by the same system but where effective execution of the process demands that they should be integrated. The problems associated with this type of integration become most acute when both systems to be integrated exhibit conflicting representations of the same underlying entity—in other words, both systems provide an implementation for the same business object, neither of which is a suitable representation for all of the scenarios in which the attributes of those objects are relevant. Breaking business objects down into their underlying attributes and assigning them to a nodes and applying the logic to the relationships between nodes will allow the matching of attribute because the attributes will be assigned to nodes which depict the same business logic in both the systems eligible for integration.

A methodology for process integration might look something akin to the following which is also the method by which conventional code using business objects can be converted to code hosted within the overlay node model structure:

Map the state model to the state models of the two systems to be integrated.

Abstract the problems and solutions offered by each application to be integrated.

Create a cluster of abstracted nodes overlaying the processes to be integrated.

Connect the abstracted nodes to the attributes in each application to be integrated.

If done right, the two sets of attributes (i.e. the abstracted set and the set from the applications) will be the same. In other words, create predictive patterns for each node in each domain and locate the data in the tables mentioned above and connect to the abstracted nodes.

Eventually, the data in these predictive patterns will be equivalent despite the table relationships and groupings being different in each of the two applications that are being integrated. Any goal based relationships as implemented by the applications are thus replaced by the node structure.

The predictive patterns extract the exactly matching data from each data base because the nodes describe the exact same data and provide the relationships which in the respective databases are different.

With regard to the simpler task of data integration, we can start to see external systems as actors that 'perform' nodes. As a result of this we can define the data transformations required to pass data out and accept data in (and process it) as part of the node structure. In other words, we can see external systems that want the data in a certain way in exactly the same way as people do. Of course systems tend to have a lower degree of tolerance when it comes to their ability to accept input that does not follow precise rules but there is no reason why this cannot be catered for. It will be however be required to build some platform elements to support different service types, platforms and so on allow for security considerations but this could be made entirely generic.

Figure 15:
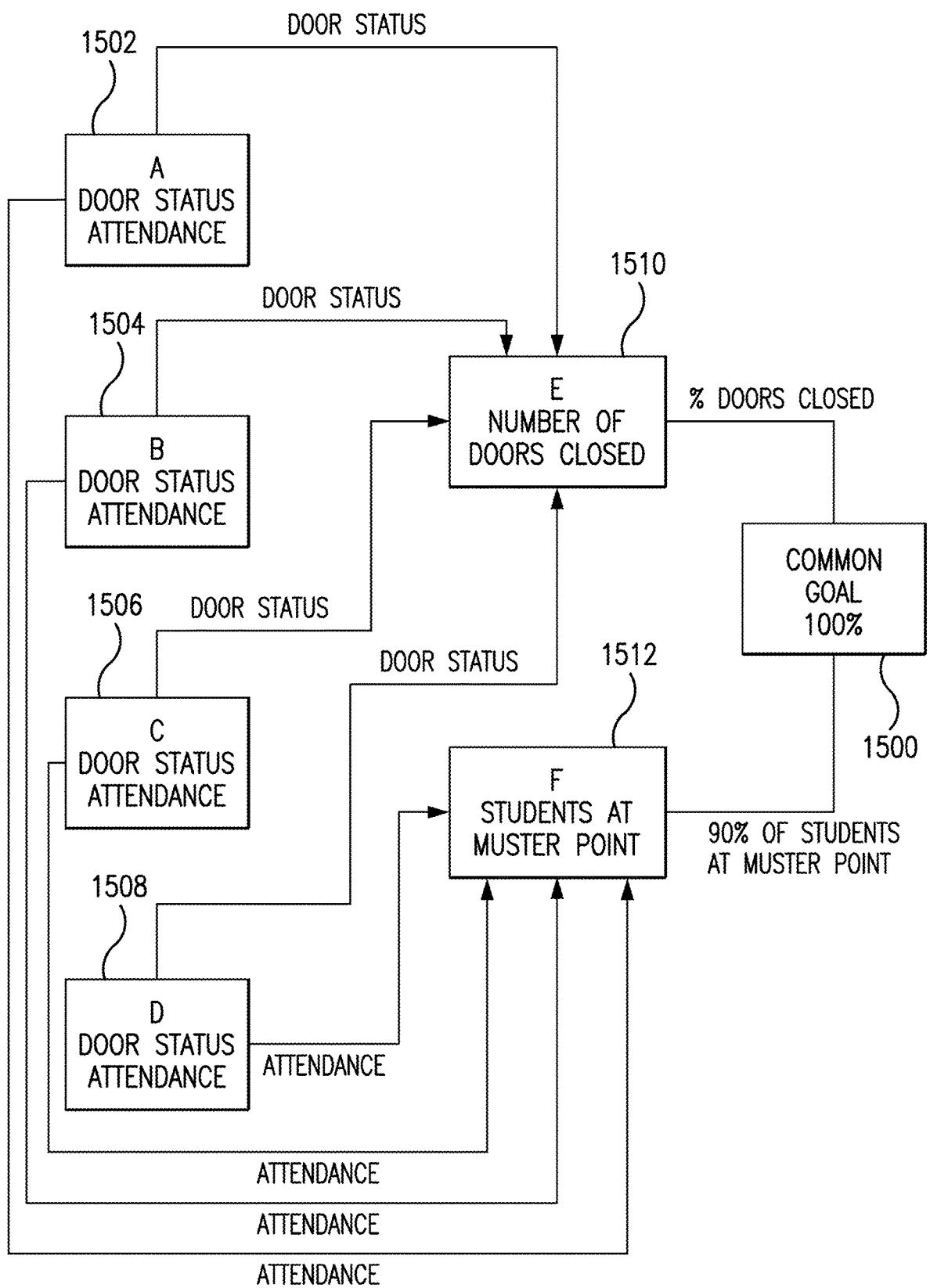
FIG. 15 schematically illustrates goal convergence in accordance with an embodiment of the disclosure.

The foregoing may be illustrated with reference to FIG. 15. In an emergency situation requiring evacuation and lockdown of a school, the common goal 1500, is 100% of the students evacuated and 100% of the doors closed. As such, two processes to be integrated are door status and number of students in the school. Two state models to be mapped are "door status" (open or closed) and "number of students present" (count students passing through an open door, +1 for entering and −1 for exiting). The problem and solutions can then be abstracted to monitor door status and count how many students pass through a door when open.

Node A 1502, node B 1504, node C 1506 and node D 1508 then represent a cluster of nodes overlaying the processes to be integrated. The abstracted nodes 1502-1508 are then connected to the attribute of door status and to the attribute of attendance. Each node has a cause and effect relationship with an intermediate goal. For example, intermediate goal E 1510 is a count of how many doors are closed and intermediate goal F 1512 are the number of students at a muster point. These goals then converge on the common goal determining the percentage of students at the muster point and the percentage of doors closed. When both are equal to 100%, the common goal 1500 is achieved.

When an attribute is identified as part of the process model, the state model is automatically extended to facilitate the storage of values for that attribute. In other words, when an attribute is newly defined as part of the process model that is represented by the predictive pattern of a node, the state model is automatically extended to facilitate the storage of values for that attribute without any programmatic extension of aid state model. In the FIG. 15 example, another attribute could be turn off the lights and the state model may be extended to include the status of the lights ("on" or "off").

Resource Allocation and Scheduling. These are two examples of common programmatic challenges likely to be faced when attempting to build systems on the platform. It is envisaged that a set of services could be built that provide computational support based on established best practices. In other words, the platform could provide generic resource allocation and scheduling engines that could be used in a variety of situations.

Advanced Data Visualisation. The platform could provide a set of services that could take a data set and render it into a chart, graph or other visualisation. Data output and associated renderings follow the output of nodes. Data input inserted within the above mentioned advanced data renderings, in other words interactivity on top of this visualisation, is again achieved by basing all renderings on the interrelated node structure. The node structure anticipated the need for user interaction. So any rendering is a manifestation of either conventional output rendering resulting from the system's processing of information, or input dialogue to accommodate user reactions to the output of the renderings.

Emergency response. Sometimes situations occur so that the priority of goals of the stakeholders and thus the input and output of the relevance connections between nodes change suddenly. If an emergency occurs, for example, a fire breaks out on the factory floor, then the goal hierarchy changes and a new emergency overlay node network applies. Relationships between processes to be followed and the individual stake holdings all change, as does the highest level goal to minimizing damage and enabling personnel to evacuate safely as compared to pre-emergency which emphasises normal enterprise goals. As one example, the function of an administrative assistant may change from data entry to preservation of the data contained in the company's database. As a second example, the function of a maintenance worker may change from maintaining equipment in good operating condition to removing electrical power from equipment. As a third example, the function of a sales person may change from contacting potential clients by telephone to notifying authorities of the emergency and then supervising the safe evacuation of the facility.

It is also recognized that during the course of an emergency, functions of physical objects and environments may change. For example, an evacuation route may be blocked and an alternative route determined or identified first responders are busy on another call and an alternative team must be identified and contacted.

Emergency response requires non-enterprise participants who are first time users to enter information regarding the status for their viewpoint of an emergency underway. This is also required of the occasional user who will be working as enterprise personnel responding to the emergency.

Figure 17:
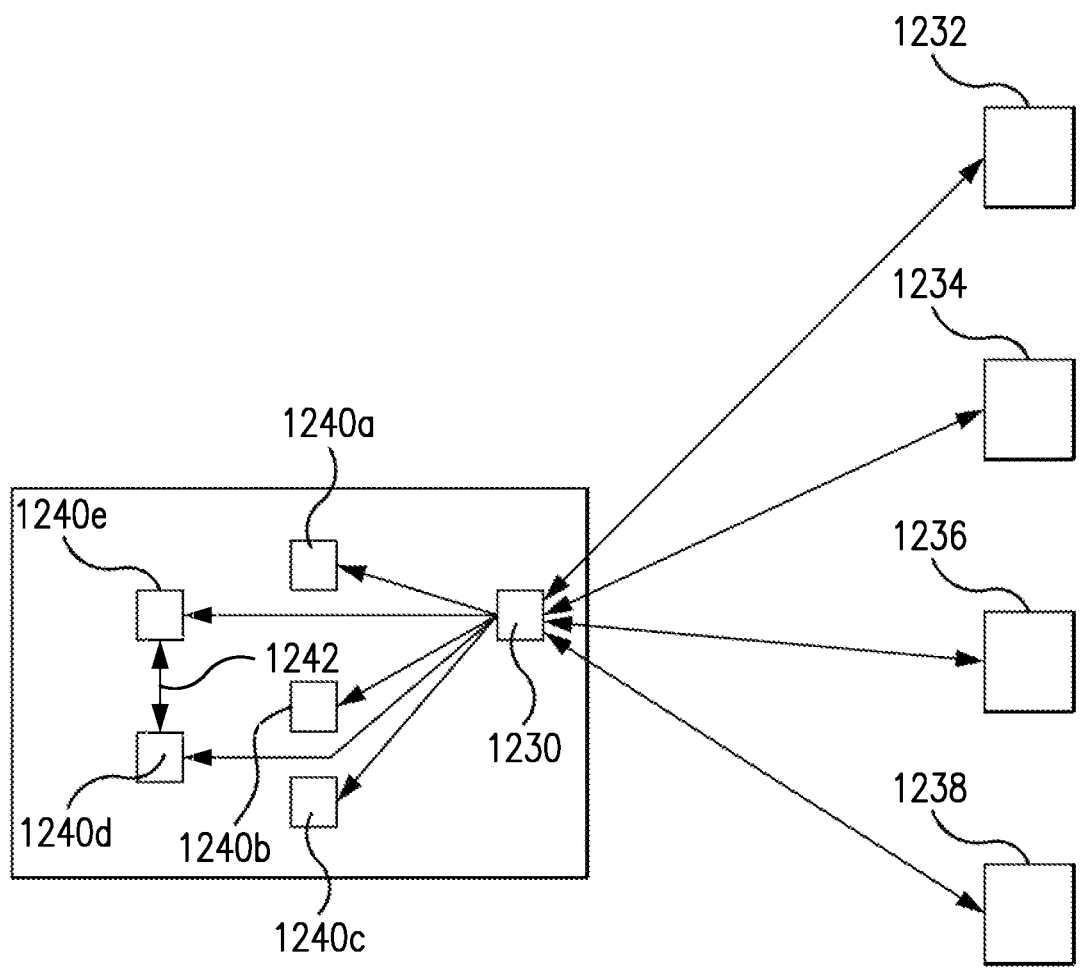
FIG. 17 schematically illustrates an emergency management system as known from the prior art.

Emergencies require co-ordinated management. With reference to FIG. 17, prior art centrally co-ordinated emergency management has utilised non-enterprise participant information but has handled it via humans taking incoming calls. A member of the organization 1230, who is preferably a safety expert, but may not be due to the scope and time of the emergency, communicates with one or more non-enterprise participants, such as a fire department 1232, police department 1234, medical staff 1236 and environmental protection agency 1238. The member 1230 is then charged with distributing this information to other members 1240*a*-1240*e* of the organization.

The prior art model has many shortfalls. Most enterprises in an emergency do not have the luxury to have a stand-by call center to take calls or experienced level people on stand-by able to interpret the information and distribute it to enterprise users who utilise it to take action and decisions. The member 1230 is receiving a lot of information from a plurality of non-enterprise participants 1232, 1234, 1236, 1238, who may not be communication with each other and who may give contradictory advice. The member is charged with disseminating the proper information to multiple members of the enterprise 1240*a*-1240*e*, each of which may have different concerns during the emergency and each of which may have changes in circumstances as a function of time. In addition, members of the enterprise 1240*d*, 1240*e*, may be communicating 1242 with each other resulting in a loss of attention to instructions from member 1230. Still further, the member 1230, may need to terminate communication, due to the emergency or due to loss of power to a cell phone. It is apparent that the prior art system is not suitable for a severe emergency in a large enterprise and a system is needed to take information and interpret it and redistribute it to decision makers and participants needing that information.

Figure 18:
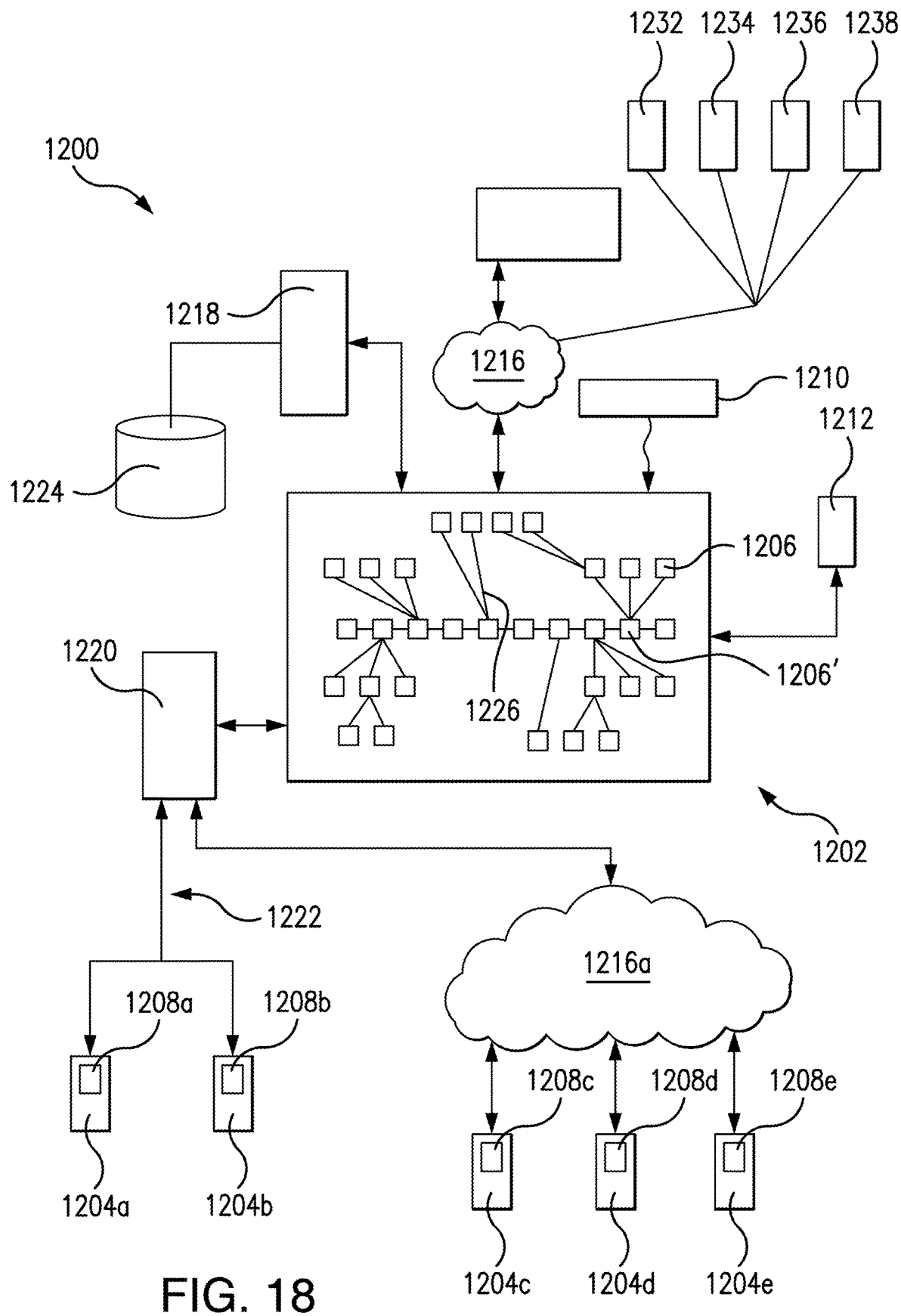
FIG. 18 schematically illustrates an emergency management system in accordance with an embodiment of the disclosure.

Referring to FIG. 18, the advent of handheld telephones with the ability for bystanders or non-enterprise personnel 1232, 1234, 1236, 1238 as well as enterprise respondents 1204*a*, 1204*b*, 1204*c*, 1204*d*, 1204*e* to use handheld devices to access the internet 1216 via local telecom networks or local wireless networks 1222 enables first time users or occasional users to participate in emergency response. They can enter information from an anticipated set of choices so that a computer processor can decide how to automatically distribute the information to interested parties. Emergencies are usually situations requiring a narrow set of remedial action so a vast set of choices is not necessary at any one time.

Each non enterprise or enterprise participant in an emergency has a narrow set of experiences and actions which need to be communicated to others. Therefore uninitiated users have few choices of action through the systems so there is an easy selection of system actions. A handheld device combined with an inexperienced user cannot be efficient if it offers the user a large choice of information or responses. To offer a narrow set of choices the system must have some degree of situational awareness.

To design a system with limited choices there is a need to emulate the exact situation at hand. For example common emergency actions are evacuation, lockdown, with various hazards associated with these such as fire, storm, intruders, and various types of physical surroundings. For every enterprise more than one of these is covered in most emergency response plans.

To build emergency response applications for handhelds the following features are required:

A central application control facility.

The central control must designate the type of emergency.

The enterprise users must be given an appropriate interface for the emergency at hand. Since enterprise users perform different activities in any one emergency they must have access to a different set of application interfaces for each specialisation in each emergency. When an emergency escalates or branches off or otherwise changes, they must be given yet more different but focused application interfaces. As enterprise users get substituted due to absence or incapacitation or situation change, other enterprise users must inherit their tasks and the appropriate user interface.

Non-enterprise users must also be given an appropriate user interface in accordance with their situation and usually their location.

When non-enterprise users or enterprise users must resort to responding with text messages these must be centrally parsed and distributed to the right stakeholders for decision or action. The system will need to be able to assign SMS messages to emergency stress points.

To achieve the above, the application will need to anticipate all actions and decisions of participants in an emergency scenario, their combinations and their variants. Preferably a system suitable for emergency response can be configured appropriately regardless of the type or nature of the emergency, the type of information, or the type of decision made from the information.

There is a need for user profiling of the user interface so that each user gets the appropriate user interface throughout the emergency.

The situation variances that change user interfaces must allow changes to be made during the emergency as soon as the situation branches off or the users change. The situation changes may be automated or instigated by designated users.

Figure 19:
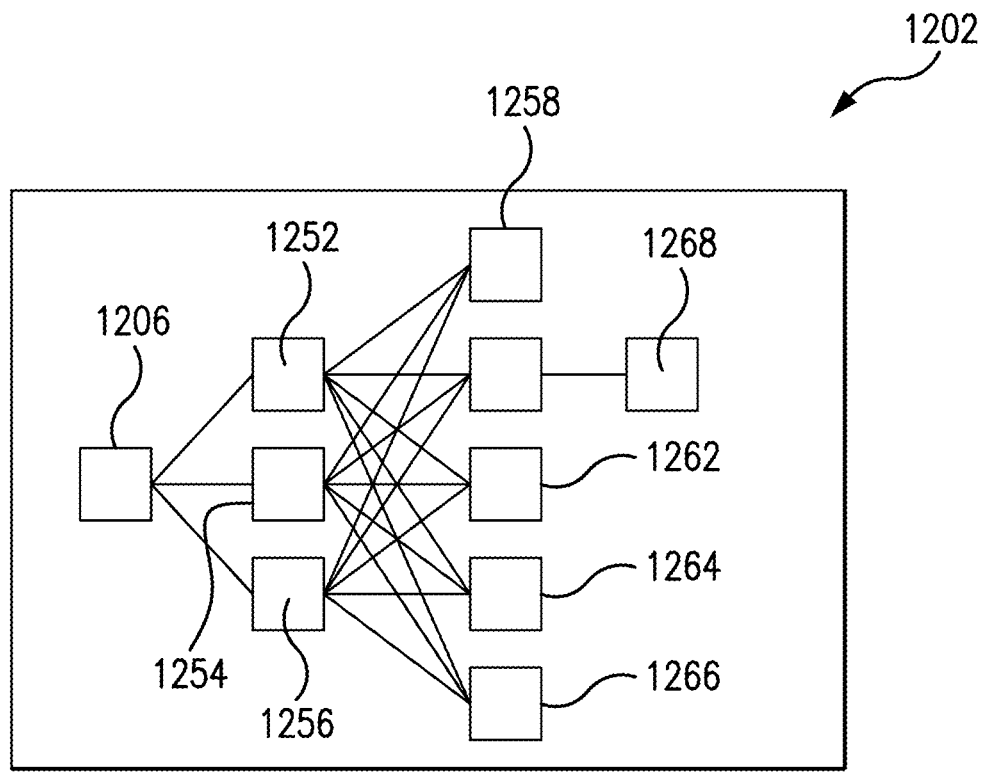
FIG. 19 is an enlarged view of a portion of the emergency management system of FIG. 18 illustrating a display of select nodes.
Figure 19:
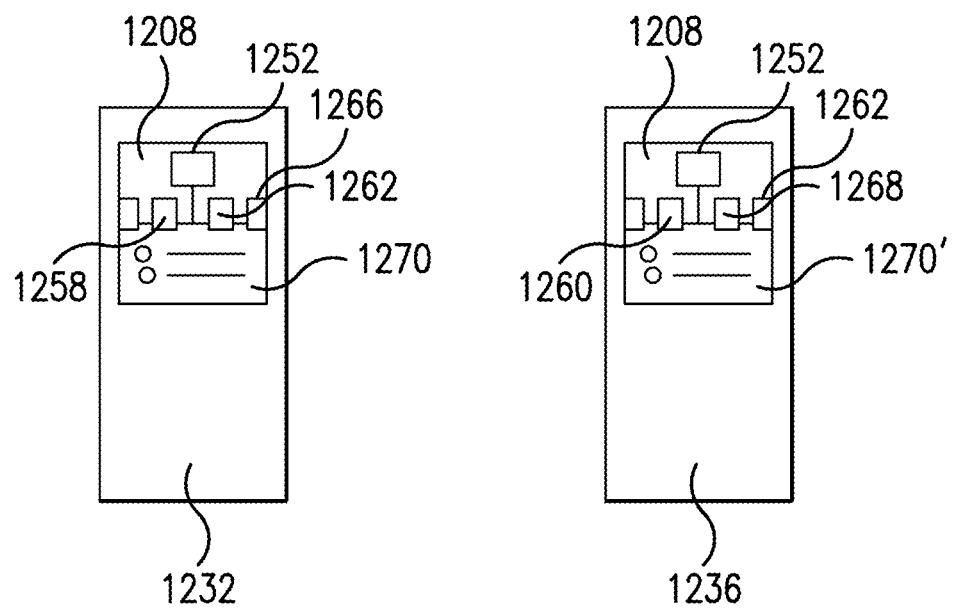

With reference to FIG. 19, a portion of facility 1202 is illustrated. Node 1206 is a stress point for an emergency and is linked to nodes identifying different types of emergencies such as fire 1252, flood 1254 and intruder 1256. These different types of emergencies have nodes in common such as location of problem 1258, number of persons who have reached a safe location 1260, number of persons unaccounted for 1262, emergency equipment on site 1264 and location of exits 1266. Some nodes may have sub-nodes, for example number of persons who have reached a safe location 1260 may have a sub-node of medical condition of each person, node 1268, and a corresponding sub-attribute in the state model corresponding to medical condition of each person.

The display screen 1208 of non-enterprise personnel, such as fire department 1230 and medical 1236 display different information of use to that personnel. For example, the fire department may view the type of emergency (fire 1252) and attributes such as location 1258 and number of persons not accounted for 1262. Other information is not displayed so as to enable the information relevant for the fire department to be large enough to be usefully visible on a small screen. The display may be scrolled, so that other information, for example, location or exits 1266, is centered in the display 1208. A limited number of user input nodes 1270, such as "is specialized equipment required"? is also displayed. With reference to FIGS. 18 and 19. If the answer to the user input query is "yes," the notation that the fire is chemical in nature may be sent to the system which may then access a database inside the enterprise to determine what chemical are burning and a remote database 1214 for instructions how to extinguish the fire and promptly relay that information back to the fire personnel 1232.

Medical personnel 1236 may also see that the emergency is a fire 1252, but location 1258 may be less relevant than number of persons in a safe location 1260 and medical condition of those persons 1268. Medical personnel may also scroll to other nodes and attributes, for example, knowing number of persons unaccounted for 1262 may aid in answering a query 1270' of whether additional medical equipment may be needed on site.

Emergencies introduce user preoccupation and possibly limited dexterity.

Size of screen is very small, alphanumeric physical and touch screen keyboards are very small.

In emergencies there is a need for systems to communicate with users and users to communicate with a system and each other to accomplish situation specific needs to transmit information and receive information. The information to be received or to be transmitted is situation specific and/or specific to user perceived needs.

Situation specific nodes are related to user perceived needs in an emergency. The relationship is through cause and effect, and sequential processes. Cause and effect concentrates related nodes. Situation instantiation by other stakeholders or by sensors allows attention of users to be directed to new alerts in the unfolding situation. Sequential nodes enable transactions in other words user input to follow sequences when necessary. Non-transactional sequences may also be necessary, such as reporting of sequential status indications. For example counting students or, for another example, a supervisor following a sequence of approval to declare a situation escalated or de-escalated.

So the system must show A) new situation instantiated nodes relevant to the user via cause and effect and B) recent user chosen nodes and their related sequential nodes and also their related nodes by cause and effect, C) the nodes depicting the greatest risk and severity to the stakeholder.

In a restricted screen with each role associated with a fairly large number of nodes. It may not be possible to show all the nodes in one screen without rendering the nodes too small to see clearly and navigate especially in an emergency. Therefore the choice of three focal points A) with the latest situation related current node and B) the node the user is currently working on or may want to return to C) the nodes depicting the greatest risk and severity to the stakeholder.

The user can navigate further afield to other nodes in accordance with the users perceived need.

To take an aircraft control panel parallel, the control panel will show the latest potential emergency risk to the role/user and all the nodes that are related by cause and effect to latest potential emergency risk node, last node of attention of the user/role, the node of highest risk and severity to the stakeholder.

A similar paradigm to the handheld is a conversation during an emergency with difficult acoustics. The listener will not engage in a conversation during the panic of an emergency unless the conversation is related to a current emergency or a new conversation about a new risk regarding the emergency or the most severe aspect of the emergency and its relevance to the specific participants.

Such a system in order to be flexible requires the use of elements described above:

Enterprise stress-points;

Relationship between enterprise stress points;

Stakeholders of enterprise stress-points;

Input from users;

Scanning of enterprise systems to find information relevant to nodes;

Language parsing of enterprise systems to find information relevant to nodes; and Contexts that allow filtering of user choices for the context of their predicament in the emergency.

Without the relationship between enterprise stress-points the system will need to have pre-designated role task relationships and pre-designated task trees. To change to a branch of the current scenario the central control will need to provide a variant task tree to each profiled user.

Alternatively object orientation is the remaining option with the associated navigational challenges.

Without relationships between tasks there will be many task trees/user interfaces profiled for the user. Adding and subtracting tasks may be the only way to have less of them. But if there are no relationships between them, tasks may be difficult to select and apply to user interfaces during the emergency.

With the Overlay relationships between process stress points, the number of user interfaces is reduced to one large continuous one with the ability to focus on any instantiated stress point. So users see the nodes around the instantiated stress points and filtered by context applying to them. In other words the system reduces each user's exposure to the interface according to the status and context and user stakeholder profiling. Status instantiation can be selected by designated users, or automatically by the system.

To take information for the field and distribute it to the right users for action and decisions, the system must anticipate the information and have a pre-planned way of presenting it to the user. This is possible using prior art software and hardware applications.

The design obstacle is getting the right user interface to each user and circumstance. In the following paragraphs are described some alternatives in the prior art.

Physical Object orientation for input. Physical object orientation is for example navigating the system by initially choosing from a choice of physical location or choice of people needing to be evacuated. Physical Object orientation in User Interface navigational is possible when there are very few choices of physical object and the physical object is a key indicator of relevant information. But complex navigation will still be required if there are many objects to choose from by each user. For example if in a school evacuation there are five buildings and various locations within them. Evacuation information on the basis of buildings as an object orientation is possible because evacuation is location and thus object related. And there are other objects relevant to an emergency such as students in a school. But there are many different students per class dependent on the time of the day. Navigating the system to find information on a student basis or a building basis, will be hard because much of the information such as injury types and situation related such as weather or respiratory problems are not easily related to these two physical objects.

Business Object orientation for viewing relevant objects. Business object navigation orientation would be via for example safety instructing documents. Displaying a depiction of a business object such as a relevant instruction document to the user is a problem because there will be too many choices per user because of the many process stages. Instructions in case of panic, in case of injury, personnel medical records, alternative exit routes based on location, etc. So business object orientation is difficult. Instantiation of current process plus some object filtering is needed to bring the right object to the attention of the user. This requires relating processes to objects. Doing this without a model is very intensive in software development and maintenance as well as inconsistent. Each object must have code written for it so that it appears at the right time for the right user. Furthermore emergency response application periodic enhancements will require new software releases while they will also increase the complexity of the system and its navigation.

Substituting users assigned set of nodes and contexts. It is likely that during an emergency the available personnel may not be according to the system default expectation as in the case of users of a normal enterprise software system. So changes to user's access both at the start and during the emergency may be needed. Doing this on the fly as the situation unfolds is only possible with the herein disclosed Overlay model or many programmatically pre-designed interfaces. Programmatically predefined interfaces must be assigned for the right use and situation on the fly, since there will be many with some being extensions. This will be quite intensive work during the emergency as well as the vast resources needed at the design and implementation stage of a tasks oriented model for the emergency response application. And without programmatically predesigned interfaces for the situation at hand plus instantiation according to developments in the emergency, navigation to the right object will be very unfriendly to handheld devices.

SMS messages used to co-ordinate an emergency. If SMS messages are sent from the field then they need to be interpreted and a central system for assigning words to nodes will be needed. Interpreting SMS messages requires the Overlay model to assign linguistically appropriate predictive pattern to nodes. The alternative is to have a team of people co-coordinating the channeling of SMS messages form source to decision making points of need.

It is therefore desirable for emergency response application to utilize the Overlay continuous user interface enabled by the model of the enterprise manifested in nodes connected by cause and effect, and the ability to instantiate a portion of the user interface for new alerts and to enable users to return to previous nodes of focus or new areas of focus relevant to the user/stakeholder.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. A system to store a state model of an enterprise having a plurality of business objects whereby changes to the enterprise are stored as up-dates to the state model, comprising:

a computing device having a computer-readable medium with executable instructions encoded on non-transient digital storage medium, the non-transient digital storage medium also storing the model of the enterprise, content of the enterprise and data of the enterprise;

a first memory that stores both status and state of a plurality of first attributes that characterize a first business object in the state model;

a second memory that stores the state model and logic in the form of process nodes;

a plurality of links between nodes of a first cluster of related process nodes, each link defining both a cause and effect relationship between adjacent process nodes and transformation logic whereby a change in an input attribute causes a status change to an output attribute;

at least one of the first attributes from the first memory being associated with process nodes of the first cluster;

a third memory storing both data and status of a plurality of second attributes that characterize a second business object in the state model;

a second cluster of related process nodes having a plurality of links, each link defining both a cause and effect relationship between process nodes and transformation logic whereby a change in an input attribute causes a status change to an output attribute;

at least one content scanner operable to scan enterprise content and related external data;

at least one language parser operable to identify concepts within the scanned content; and at least one indexing engine in communication with the at least one content scanner and at least one language parser and operable to index information against enterprise stress points.

2. The system of claim 1 wherein the transformation logic is located solely on the links within the cluster of related process nodes.

3. The system of claim 2 wherein the process nodes are instantiated by the status changes from the input attribute via a logical link to the output attribute.

4. The system of claim 3 wherein process nodes link together related attributes via contextual filtering.

5. The system of claim 1 wherein organizational nodes organize multiple process nodes and lack a cause and effect relationship to other nodes.

6. The system of claim 4 wherein the process nodes are organized in clusters and abstracted classes of organizational nodes and links are configured to identify domain specific issues and to facilitate re-use of process nodes for similar processes.

7. An overlay system where both a class level attribute and all class level relationships to other attributes are in a model of an enterprise with embedded computer logic connecting the attributes, comprising:

a computing device having a computer-readable medium with executable instructions encoded on non-transient digital storage medium, the non-transient digital storage medium also storing the model of the enterprise, content of the enterprise and data of the enterprise;

a relationship between multiple nodes, each individual node having one attribute depicting node status value and one or more attributes depicting context;

whereby the one or more attributes depicting context are common to a plurality of nodes and constitute key identifiers of those nodes;

at least one content scanner operable to scan enterprise content and related external data;

at least one language parser operable to identify concepts within the scanned content; and at least one indexing engine in communication with the at least one content scanner and at least one language parser and operable to index information against enterprise stress points.

8. The overlay system of claim 7 wherein the overlay model is built to include goals, processes and problems of the enterprise.

* * * * *